(12) United States Patent
Lee et al.

(10) Patent No.: US 8,438,600 B2
(45) Date of Patent: May 7, 2013

(54) METHOD OF PROCESSING EPG METADATA IN NETWORK DEVICE AND NETWORK DEVICE FOR CONTROLLING THE SAME

(75) Inventors: Joon Hui Lee, Yongin-si (KR); Gomer Thomas, Arlington, WA (US); Hyun Jae Lee, Seoul (KR); Man Sik Choi, Seoul (KR); Jae Hyung Song, Seoul (KR)

(73) Assignee: LG Electronics Inc., Seoul (KR)

(*) Notice: Subject to any disclaimer, the term of this patent is extended or adjusted under 35 U.S.C. 154(b) by 461 days.

(21) Appl. No.: 12/805,805

(22) Filed: Aug. 19, 2010

(65) Prior Publication Data

US 2011/0126239 A1    May 26, 2011

Related U.S. Application Data

(60) Provisional application No. 61/235,360, filed on Aug. 20, 2009, provisional application No. 61/301,640, filed on Feb. 5, 2010.

(51) Int. Cl.
*G06F 13/00* (2006.01)
*G06F 3/00* (2006.01)
*H04N 5/445* (2011.01)

(52) U.S. Cl.
USPC .................. 725/50; 725/44; 725/54; 725/39; 725/45

(58) Field of Classification Search .............. 725/50, 725/44, 54, 39, 45
See application file for complete search history.

(56) References Cited

U.S. PATENT DOCUMENTS

| 2007/0157282 | A1 | 7/2007 | Park et al. |
| 2008/0126477 | A1 | 5/2008 | Kim |
| 2008/0178248 | A1 | 7/2008 | Kim et al. |
| 2009/0063649 | A1 | 3/2009 | Yamagishi |
| 2009/0150933 | A1 | 6/2009 | Lee et al. |
| 2009/0260032 | A1 | 10/2009 | Li et al. |

FOREIGN PATENT DOCUMENTS

| JP | 2009-059160 A | 3/2009 |
| KR | 10-2008-0048763 A | 6/2008 |
| KR | 10-2008-0063714 A | 7/2008 |
| KR | 10-2008-0065216 A | 7/2008 |
| KR | 10-2009-0059082 A | 6/2009 |
| WO | WO 2008/098500 A1 | 8/2008 |

*Primary Examiner* — Scott Beliveau
*Assistant Examiner* — Christine Kurien
(74) *Attorney, Agent, or Firm* — McKenna Long & Aldridge LLP

(57) ABSTRACT

A method of processing EPG (Electronic Program Guide) metadata in a network device includes performing a service discovery procedure utilizing multiple service discovery metadata components supplied by a service provider, receiving EPG metadata corresponding to a super group information element comprising both of a member element giving a group ID of another super group information element that has a higher level than a level of the super group information element and a level attribute giving a level of super group represented by the super group information element, wherein the member element is used to reference the other super group information element at a higher level, and processing the EPG metadata.

18 Claims, 57 Drawing Sheets

FIG. 13

```
<complexType name="CODCatalogServerInfoType">
 <sequence>
 <element name="CODCatalogServerLocator" type="cddc:EPGDataLocatorType"/>
 <element name="TargetServiceProviderID" type="gt:IIFIDType" minOccurs="0"/>
 </sequence>
</complexType>
<complexType name="CODServiceInfoType">
<sequence>
<element name="CODCatalogServerInfo" type="cddc:CODCatalogServerInfoType" minOccurs="0" maxOccurs="unbounded"/>
<element name="ThinClientPortal" type="anyURI" minOccurs="0"/>
<element name="CODApplicationServer" type="anyURI" minOccurs="0" maxOccurs="unbounded"/>
<element name="ITFMaxiumumCODBandwidth" type="positiveInteger" minOccurs="0"/>
<element name="ITFMiniumumCODStorageSpace" type="positiveInteger" minOccurs="0"/>
</sequence>
</complexType>
```

FIG. 23

```
<simpleType name="TypeOfSourceType">
    <restriction base="string">
        <enumeration value="HD"/>
        <enumeration value="SD"/>
        <enumeration value="PIP"/>
        <enumeration value="SdBarker"/>
        <enumeration value="HdBarker"/>
        <enumeration value="PipBarker"/>
        <enumeration value="CODContentHD"/>
        <enumeration value="CODContentSD"/>
        <enumeration value="CODContentLRServerLocator"/>
    </restriction>
</simpleType>
```

FIG. 30

```
<complexType name="EPGProviderInfoType">
 <sequence>
 <element name="EPGProviderName" type="mpeg7:TextualType" maxOccurs="unbounded"/>
 <element name="EPGProviderDescription" type="mpeg7:TextualType" minOccurs="0"
maxOccurs="unbounded"/>
 <element name="EPGDataLocator" type="cddc:EPGDataLocatorType"/>
 <element name="TargetServiceProviderID" type="gt:IIFIDType" minOccurs="0"/>
 <element name="EPGProviderLogo" type="mps:ResourceLocatorType" minOccurs="0"/>
 <element name="SupportedServiceType" type="cddc:TypeOfSupportedServiceType" minOccurs="0"
maxOccurs="unbounded"/>
 </sequence>
 <attribute name="epgProviderID" type="gt:IIFIDType" use="optional"/>
 <attribute name="version" type="unsignedInt"/>
</complexType>
```

FIG. 31

```
<simpleType name="TypeOfSupportedServiceType">
    <restriction base="string">
            <enumeration value="ALL"/>
            <enumeration value="LinearTV"/>
            <enumeration value="CODService"/>
    </restriction>
</simpleType>
```

FIG. 33

```
<complexType name="EPGDataLocatorType">
  <choice maxOccurs="unbounded">
    <element name="MulticastEPGService">
      <complexType>
        <complexContent>
          <extension base="mps:FluteSessionLocatorType">
            <attribute name="SupportedServiceType" type="cddc:TypeOfSupportedServiceType"/>
          </extension>
        </complexContent>
      </complexType>
    </element>
    <element name="UnicastEPGService">
      <complexType>
       <simpleContent>
        <extension base="anyURI">
          <attribute name="SupportedServiceType" type="cddc:TypeOfSupportedServiceType"/>
        </extension>
       </simpleContent>
      </complexType>
    </element>
  </choice>
</complexType>
```

FIG. 35

```
<complexType name="EPGProviderInfoType">
 <sequence>
 <element name="EPGProviderName" type="mpeg7:TextualType" maxOccurs="unbounded"/>
 <element name="EPGProviderDescription" type="mpeg7:TextualType" minOccurs="0"
maxOccurs="unbounded"/>
 <element name="EPGDataLocator" type="cddc:EPGDataLocatorType"/>
 <element name="TargetServiceProviderID" type="gt:IIFIDType" minOccurs="0"/>
 <element name="EPGProviderLogo" type="mps:ResourceLocatorType" minOccurs="0"/>
 <element name="SupportedServiceType" type="cddc:TypeOfSupportedServiceType" minOccurs="0"
maxOccurs="unbounded"/>
 <element name="TargetServiceID" type="gt:IIFIDType" minOccurs="0" maxOccurs="unbounded"/
 </sequence>
 <attribute name="epgProviderID" type="gt:IIFIDType" use="optional"/>
 <attribute name="version" type="unsignedInt"/>
 </complexType>
```

FIG. 37

```
<complexType name="EPGDataLocatorType">
  <choice maxOccurs="unbounded">
    <element name="MulticastEPGService">
      <complexType>
        <complexContent>
          <extension base="mps:FluteSessionLocatorType">
            <sequence>
              <element name="SupportedServiceType" type="cddc:TypeOfSupportedServiceType" minOccurs="0" maxOccurs="unbounded"/>
              <element name="TargetServiceID" type="gt:IIFIDType" minOccurs="0" maxOccurs="unbounded"/>
            </sequence>
          </extension>
        </complexContent>
      </complexType>
    </element>
    <element name="UnicastEPGService" type="cddc:UnicastEPGServiceType"/>
  </choice>
</complexType>
<complexType name="UnicastEPGServiceType">
<sequence>
  <element name="UnicastEPGServiceLocation" type="anyURI"/>
  <element name="SupportedServiceType" type="cddc:TypeOfSupportedServiceType" minOccurs="0" maxOccurs="unbounded"/>
  <element name="TargetServiceID" type="gt:IIFIDType" minOccurs="0" maxOccurs="unbounded"/>
</sequence>
</complexType>
```

FIG. 41

```
<complexType name="ProgramInformationType">
    <sequence>
        <element name="BasicDescription"
        type = "epg:BasicContentDescriptionType"/>
        <element name="OtherIdentifier"
        type = "mpeg7:UniqueIDType"
        minOccurs = "0"
        maxOccurs = "unbounded"/>
        <element name="AVAttributes"
        type = "epg:AVAttributesType"
        minOccurs = "0"/>
        <element name="MemberOf"
        type = "tva:BaseMemberOfType"
        minOccurs = "0"
        maxOccurs = "unbounded"/>
        <element name="DerivedFrom"
        type = "tva:DerivedFromType"
        minOccurs = "0"/>
        <element name="EpisodeOf"
        type = "tva:EpisodeOfType"
        minOccurs = "0"/>
        <element name="PartOfAggregatedProgram"
        type = "tva:CRIDType"
        minOccurs = "0"/>
        <element name="AggregationOf"
        type = "tva:AggregationOfType"
        minOccurs = "0"/>
    </sequence>
    <attribute name="programId"
        type = "tva:CRIDType"
        use = "required"/>
    <attribute name="metadataOriginIDRef"
        type = "tva:TVAIDRefType"
        use = "optional"/>
    <attribute ref = "xml:lang" use = "optional"/>
</complexType>
```

FIG. 43

```xml
<complexType name="BasicContentDescriptionType">
  <sequence>
    <element name="Title" type="mpeg7:TitleType" minOccurs="0" maxOccurs="unbounded"/>
    <element name="MediaTitle" type="mpeg7:TitleMediaType" minOccurs="0" maxOccurs="unbounded"/>
    <element name="ShortTitle" type="tva:ShortTitleType" minOccurs="0" maxOccurs="unbounded"/>
    <element name="Synopsis" type="tva:SynopsisType" minOccurs="0" maxOccurs="unbounded"/>
    <element name="PromotionalInformation" type="mpeg7:TextualType" minOccurs="0" maxOccurs="unbounded"/>
    <element name="ProgramURL" type="anyURI" minOccurs="0" maxOccurs="unbounded"/>
    <element name="ProgramInfoURL" type="anyURI" minOccurs="0" maxOccurs="unbounded"/>
    <element name="Keyword" type="tva:KeywordType" minOccurs="0" maxOccurs="unbounded"/>
    <element name="Genre" type="tva:GenreType" minOccurs="0" maxOccurs="unbounded"/>
    <element name="RRTParentalGuidance" type="epg:RRTParentalGuidanceType" minOccurs="0" maxOccurs="unbounded"/>
    <element name="ParentalGuidance" type="mpeg7:ParentalGuidanceType" minOccurs="0" maxOccurs="unbounded"/>
    <element name="Language" type="mpeg7:ExtendedLanguageType" minOccurs="0" maxOccurs="unbounded"/>
    <element name="CaptionLanguage" type="tva:CaptionLanguageType" minOccurs="0" maxOccurs="unbounded"/>
    <element name="SignLanguage" type="tva:SignLanguageType" minOccurs="0" maxOccurs="unbounded"/>
    <element name="CreditsList" type="epg:CreditsListType" minOccurs="0"/>
    <element name="AwardsList" type="epg:AwardsListType" minOccurs="0"/>
    <element name="BoxOffice" type="tva:PriceType" minOccurs="0" maxOccurs="unbounded"/>
    <element name="RelatedMaterial" type="tva:RelatedMaterialType" minOccurs="0" maxOccurs="unbounded"/>
    <element name="ProductionDate" type="tva:TVATimeType" minOccurs="0"/>
    <element name="ProductionLocation" type="mpeg7:regionCode" minOccurs="0" maxOccurs="unbounded"/>
    <element name="CreationCoordinates" type="tva:CreationCoordinatesType" minOccurs="0" maxOccurs="unbounded"/>
    <element name="DepictedCoordinates" type="tva:DepictedCoordinatesType" minOccurs="0" maxOccurs="unbounded"/>
    <element name="ReleaseInformation" type="tva:ReleaseInformationType" minOccurs="0" maxOccurs="unbounded"/>
    <element name="Duration" type="duration" minOccurs="0"/>
    <element name="PurchaseList" type="epg:PurchaseListType" minOccurs="0"/>
  </sequence>
  <attribute name="programFormat" use="optional">
    <simpleType>
      <restriction base="string">
        <enumeration value="Series"/>
        <enumeration value="Movie"/>
        <enumeration value="Paid program"/>
        <enumeration value="Special"/>
      </restriction>
    </simpleType>
  </attribute>
  <attribute name="copyRestrictions" type="epg:CopyControlInformationType" use="optional"/>
</complexType>
```

FIG. 45

| Value | Fragment Type |
|---|---|
| 0X80 | IIFMain fragment |
| 0X81 | MetadataOriginationInformation fragment |
| 0X82 | ClassificationScheme fragment |
| 0X83 | CSAlias fragment |
| 0X84 | RatingRegionTablefragment |
| 0X85 | ProgramInformation fragment |
| 0X86 | GroupInformation fragment |
| 0X87 | SuperGroupInformation fragment |
| 0X88 | Schedule fragment |
| 0X89 | BroadcastEvent fragment |
| 0X8A | OnDemandProgram fragment |
| 0X8B | OnDemandService fragment |
| 0X8C | PersonName fragment |
| 0X8D | OrganizationName fragment |
| 0X8E | Review fragment |
| 0X8F | PurchaseInformation fragment |

FIG. 47

```
<xs:complexType name="ResultFragmentsRangeType">
  <xs:attribute name="totalResultNumber" type="xs:unsignedInt" use="required"/>
  <xs:attribute name="startFragmentNumber" type="xs:unsignedInt" use="required"/>
  <xs:attribute name="numberOfFragments" type="xs:unsignedInt" use="optional"/> </xs:complexType>
</xs:complexType>
```

FIG. 49

```
<xs:complexType name="ResultProgramsRangeType">
 <xs:attribute name="numberOfTotalResult" type="xs:unsignedInt" use="required"/>
 <xs:attribute name="startIndexOfReturnedProrgram" type="xs:unsignedInt" use="required"/>
 <xs:attribute name="numberOfReturnedPrograms" type="xs:unsignedInt" use="optional"/>
</xs:complexType>
```

FIG. 50

```
<xs:complexType name="ResultProgramsRangeType">
  <xs:attribute name="numberOfTotalResult" type="xs:unsignedInt" use="required"/>
  <xs:attribute name="startIndexOfReturnedProrgram" type="xs:unsignedInt" use="required"/>
  <xs:attribute name="queryReferenceId" type="xcddc:IIFIDType" use="optional"/>
  <xs:attribute name="queryReferenceId" type="xcddc:IIFIDType" use="optional"/>
</xs:complexType>
```

FIG. 52

```
<complexType name="SuperGroupTypeType">
    <complexContent>
        <extension base="tva:BaseProgramGroupTypeType">
            <attribute name="value" use="required">
                <simpleType>
                    <restriction base="string">
                        <enumeration value="seriesFamily"/>
                        <enumeration value="otherChoice"/>
                        <enumeration value="heirarchyOfService"/>
                    </restriction>
                </simpleType>
            </attribute>
        </extension>
    </complexContent>
</complexType>
```

FIG. 55

```
<complexType name="SuperGroupInformationType">
  <sequence>
    <element name="GroupType" type="epg:SuperGroupTypeType"/>
    <element name="BasicDescription" type="epg:BasicContentDescriptionType"/>
    <element name="MemberOf" type="tva:BaseMemberOfType" minOccurs="0" maxOccurs="unbounded"/>
  </sequence>
    <attribute name="groupId" type="tva:CRIDType" use="required"/>
    <attribute name="ordered" type="boolean" use="optional" default="false"/>
    <attribute name="numOfItems" type="unsignedInt" use="optional"/>
    <attributeGroup ref="tva:fragmentIdentification"/>
    <attribute name="metadataOriginIDRef" type="tva:TVAIDRefType" use="optional"/>
    <attribute ref="xml:lang" use="optional"/>
    <attribute name="levelOfNesting" default="0">
      <simpleType>
        <restriction base="unsignedByte">
          <minInclusive value="0"/>
          <maxInclusive value="2"/>
        </restriction>
      </simpleType>
    </attribute>
</complexType>
```

METHOD OF PROCESSING EPG METADATA IN NETWORK DEVICE AND NETWORK DEVICE FOR CONTROLLING THE SAME

This application claims the benefit of U.S. Provisional Application Nos. 61/235,360 and 61/301,640, filed on Aug. 20, 2009, and Feb. 5, 2010, which are hereby incorporated by reference as if fully set forth herein.

BACKGROUND OF THE INVENTION

1. Field of the Invention

The present invention relates to EPG metadata, and more particularly, to an IPTV and method of processing EPG metadata therein.

2. Discussion of the Related Art

In a conventional TV system, a content produced by a broadcasting service provider is transmitted via such a radio wave transfer medium as terrestrial, cable, satellite and the like and a viewer is able to view the content via a TV receiver capable of receiving the transfer medium. As the digital TV technology is developed and commercialized from the conventional analog broadcasting, a viewer can be provided with various contents including real-time broadcasts, CoD (contents on demand), games, news and the like using Internet connected to each home as well as the conventional radio wave media. For example, the contents via internet can be provided via IPTV (internet protocol TV).

However, the related art fails to provide a method for a network device (e.g., an IPTV, etc.) to search and process EPG (electronic program guide) metadata quickly and efficiently.

SUMMARY OF THE INVENTION

Accordingly, the present invention is directed to a method of processing EPG metadata in a network device and a network device for controlling the same that substantially obviate one or more problems due to limitations and disadvantages of the related art.

An object of the present invention is to provide protocol, by which a network device (e.g., an IPTV, etc.) is enabled to process an EPG service related to contents of a real-time TV service (or a linear TV service) or a COD (contents on demand) service more quickly.

Another object of the present invention is to provide method of processing EPG metadata, by which EPG metadata of various types ongoing to rise can be more efficiently processed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing EPG metadata in a network device includes performing a service discovery procedure utilizing multiple service discovery metadata components supplied by a service provider, receiving EPG metadata corresponding to a super group information element comprising both of a member element giving a group ID of another super group information element that has a level higher than a level of the super group information element and a level attribute giving a level of super group represented by the super group information element, wherein the member element is used to reference the other super group information element at a higher level, and processing the EPG metadata.

The performing step may include receiving a master SI table which locates in a master SI table location in provisioning information, receiving a virtual channel map table which locates in virtual channel map locations in the received master SI table, receiving a virtual channel description table which locates in virtual channel description table locations in the received virtual channel map table, and receiving a source table which locates in source table locations in the received virtual channel description table.

According to one embodiment of the present invention, a network device (e.g., an IPTV, etc.) is able to process an EPG service related to contents of a real-time TV service (or a linear TV service) or a COD (contents on demand) service more quickly.

According to another embodiment of the present invention, EPG metadata of various types ongoing to rise can be more efficiently processed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 13 is a diagram showing another example of COD service information designed according to FIG. 11;

FIG. 23 is a diagram showing an example of type of source according to an embodiment of the present invention;

FIGS. 29 and 30 are diagrams showing a data structure of EPG provider information according to an embodiment of the present invention;

FIG. 31 is a diagram showing a data structure of type of supported service according to an embodiment of the present invention;

FIGS. 32 and 33 are diagrams showing a data structure of an EPG data locator according to an embodiment of the present invention;

FIGS. 34 and 35 are diagrams showing a data structure of EPG provider information according to another embodiment of the present invention;

FIGS. 36 and 37 are diagrams showing a data structure of an EPG data locator according to another embodiment of the present invention;

FIGS. 40 and 41 are diagrams showing an example of program information according to an embodiment of the present invention;

FIGS. 42 and 43 are diagrams showing an example of basic description according to an embodiment of the present invention;

FIG. 45 is a diagram showing fragment values according to an embodiment of the present invention;

FIGS. 46 and 47 are diagrams showing a data structure of a result fragments range according to an embodiment of the present invention;

FIGS. 48, 49 and 50 are diagrams showing a data structure of a result programs range according to an embodiment of the present invention;

FIG. 52 is a diagram showing a data structure of a super group according to an embodiment of the present invention;

FIGS. 54 and 55 are diagrams showing a data structure of super group information according to an embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way.

For instance, such a terminology as a network device is used in this disclosure. And, this terminology can correspond to one of an IPTV (Internet Protocol TeleVision), an ITF (IPTV Terminal Function), a digital television, a mobile device and the like.

Figure 1:
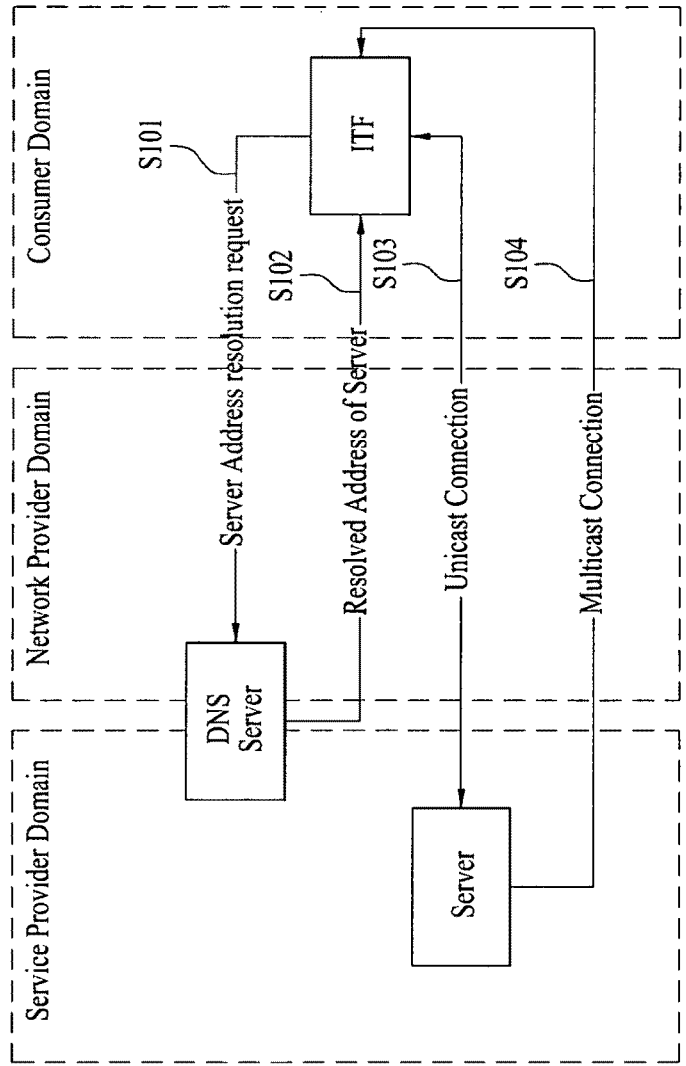
FIG. 1 is a diagram for an IPTV service according to one embodiment of the present invention.

FIG. 1 is a diagram for an IPTV service according to one embodiment of the present invention.

First of all, a service address on IP is determined as URL type for example and an ITF makes a request for an IP address and the like to a DNS server and then receives the requested IP address and the like. The ITF accesses a server by multicast or unicast.

Referring to FIG. 1, an ITF makes a server address resolution request (S101). The ITF receives a resolved address of server from a DNS server (S102). The ITF is connected to a server by a unicast (S103) or a multicast (S104).

Figure 2:
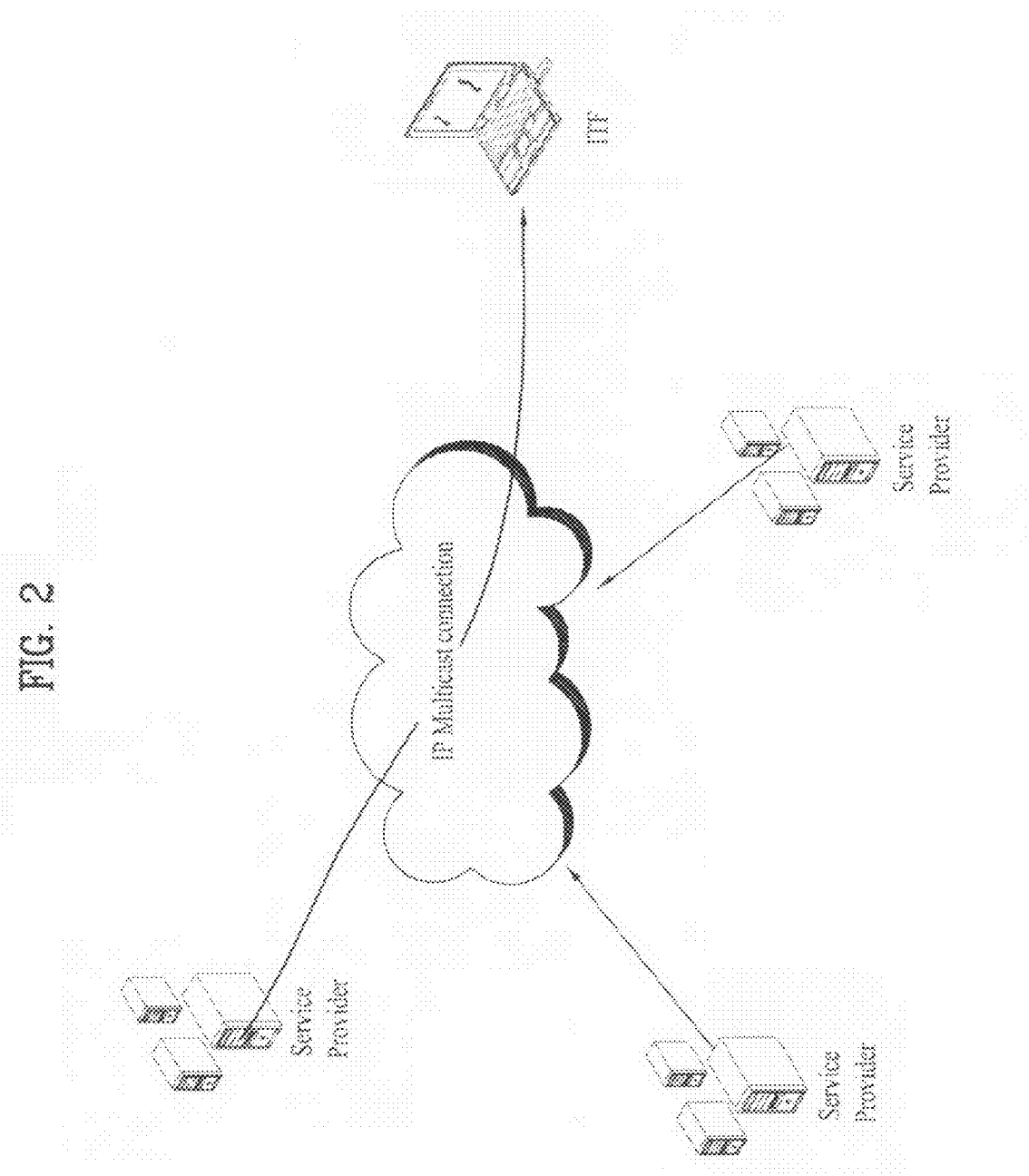
FIG. 2 is a diagram for a multicast method according to one embodiment of the present invention.

FIG. 2 is a diagram for a multicast method according to one embodiment of the present invention.

Referring to FIG. 2, although a plurality of ITFs join a single multicast stream, 1-to-many connections are achieved instead of 1-to-1 access to the server per ITF.

Figure 3:
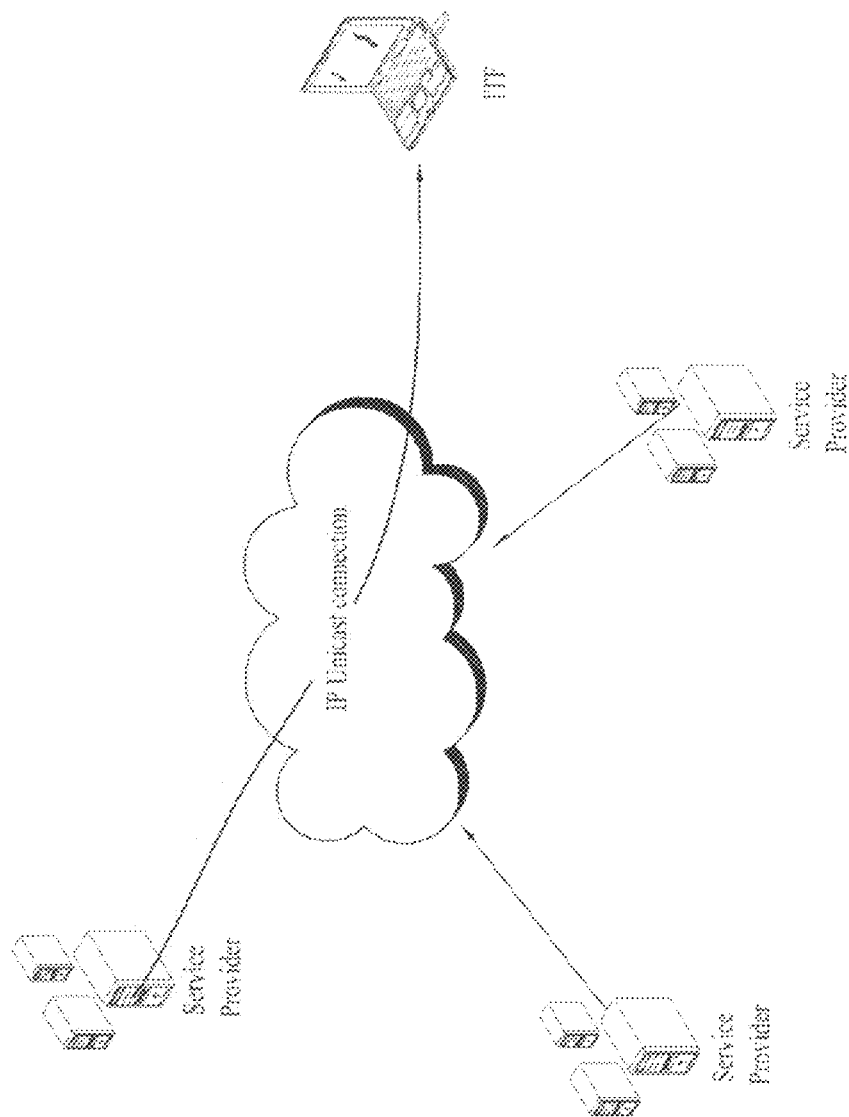
FIG. 3 is a diagram for a unicast method according to one embodiment of the present invention.

FIG. 3 is a diagram for a unicast method according to one embodiment of the present invention.

Referring to FIG. 3, 1-to-1 connection is established between an ITF and a server to transceive data in-between.

Figure 4:
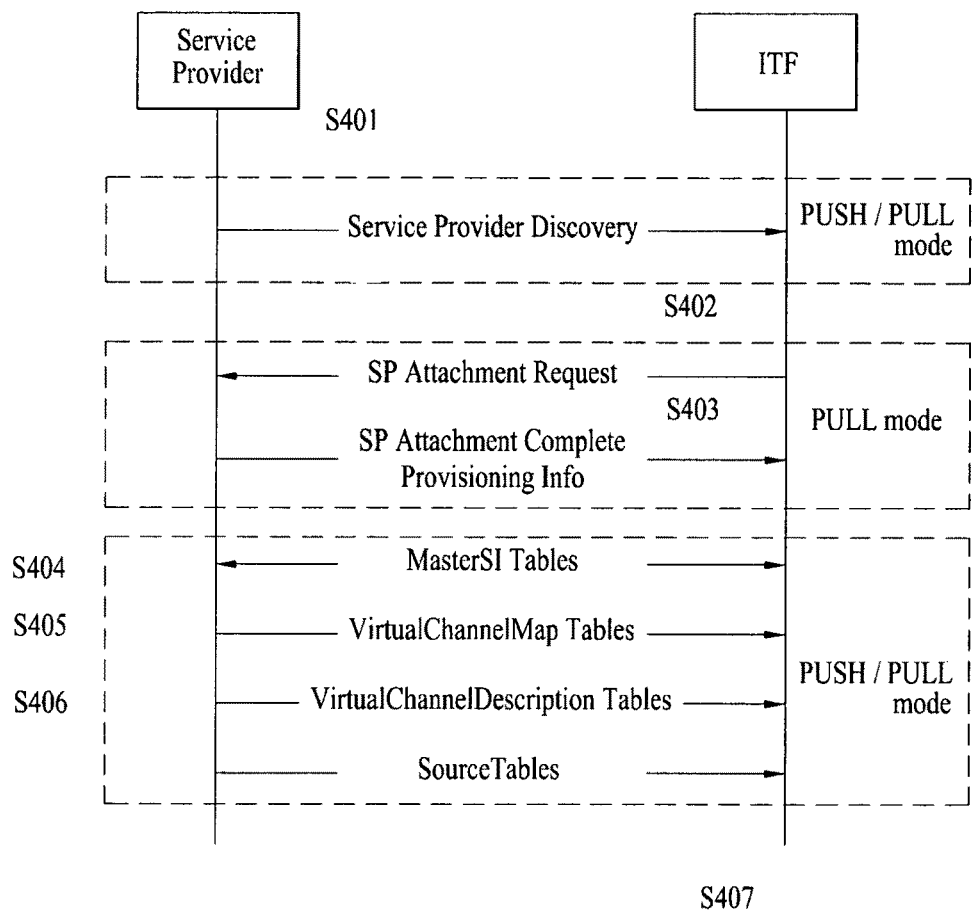
FIG. 4 is a diagram of a process for searching an IPTV service according to one embodiment of the present invention.

FIG. 4 is a diagram of a process for searching an IPTV service according to one embodiment of the present invention.

A service provider performs a service provider discovery (S401). An ITF performs a SP attachment request (S402). The ITF receives provisioning information after SP attachment complete (S403). Furthermore, the ITF receives master SI tables from the service provider (S404), receives virtual channel map tables from the service provider (S405), receives virtual channel description tables from the service provider (S406), and receives source tables from the service provider (S407).

This is explained in detail as follows.

First of all, the service provider discovery can mean a process for service providers providing services related to IPTV to discover a server that provides information on services provided by the service providers. A method for discovering an address list for obtaining information (e.g., SP discovery information) on an SD (service discovery) server includes one of the three kinds of methods for example. First of all, it is able to use an address preset in the ITF or an address manually set by a user. Secondly, it is able to use a DHCP based SP discovery method (e.g., DHCP option). Thirdly, it is able to use a DNS SRV-based SP discovery method (e.g., DNS SRV mechanism).

Moreover, the ITF accesses a server at the address obtained by one of the above three kinds of methods and then receives a service provider discovery record containing information necessary for the per-SP service discovery. Subsequently, the ITF performs a service searching step using the received service provider discovery record. Theses steps are available for one of a push mode and a pull mode.

The ITF accesses an SP attachment server designated as an SP attachment locator of the SP discovery record and then performs an ITF registration procedure (or a service attachment procedure). In this case, information delivered to the server from the ITF can have a format of an ITF registration input type record. Alternatively, it is able to perform the service attachment procedure using information of a query term type of HTTP GET method.

Moreover, the ITF accesses an authentication service server of SP, which is designated as an SP authentication locator, performs a separate authentication procedure, and is then able to perform a service authentication procedure.

Meanwhile, after the service attachment procedure has been successfully completed, data transmitted to the ITF by the server can have a format of a provisioning information table.

In the service attachment procedure, the ITF transmits the data to the server in a manner that its ID and location information are contained in the data. Subsequently, the service attachment server is able to specify a service the ITF has subscribed based on the received ID and location information. Moreover, address information, from which the ITF can obtain service information, is provided as a provisioning information table. This address information corresponds to access information of a master SI table. In case of using this method, it is facilitated to provide a subscriber-specific service.

The service information includes access information on a virtual channel map, a master SI table record for managing a version, a virtual channel map table for providing a service list of a package type, and a virtual channel description table including detailed information of each channel, a source table including access information for accessing a service actually, and the like.

Figure 5:
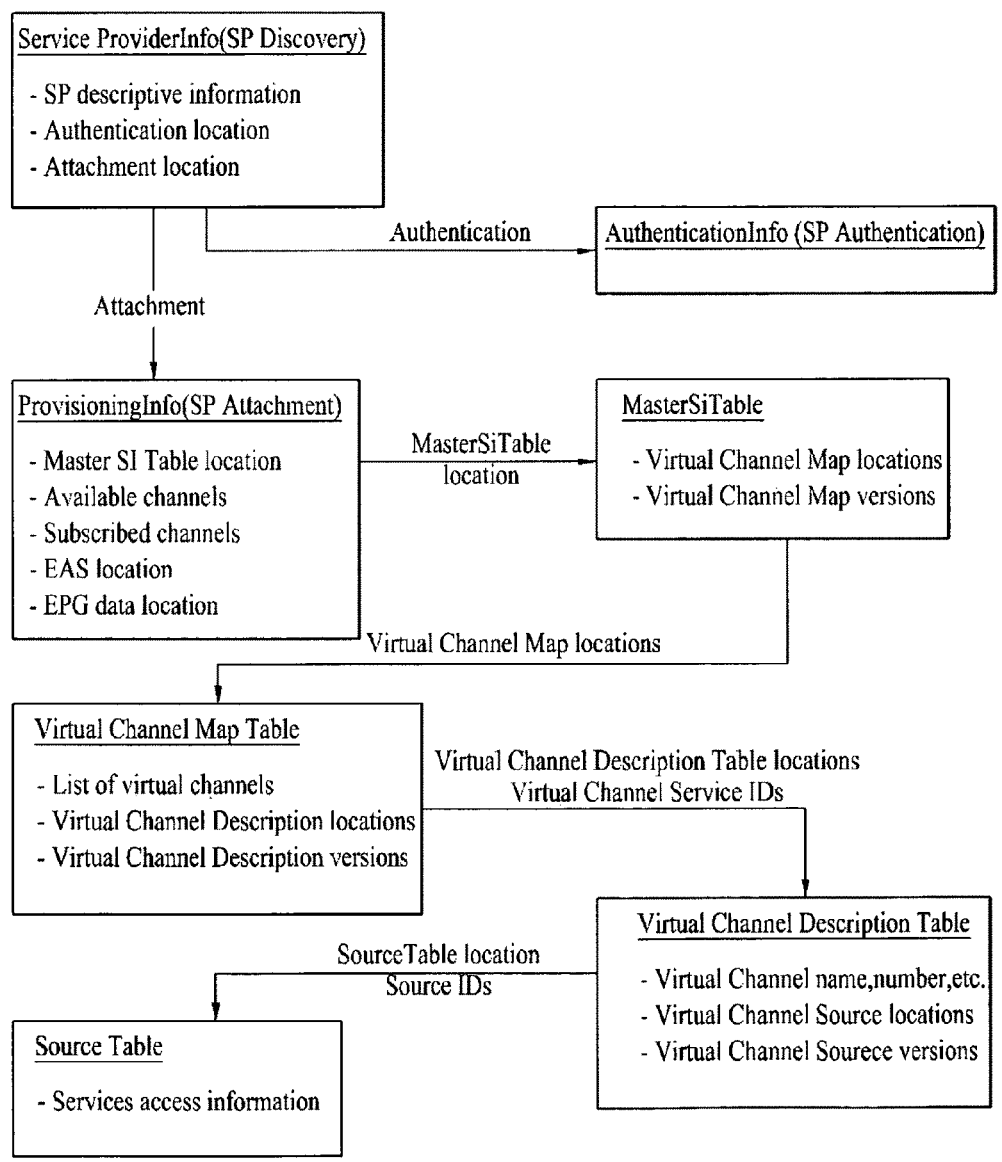
FIG. 5 is a detailed diagram of FIG. 4.

FIG. 5 is a detailed diagram of FIG. 4. Inter-data relations within SI are described with reference to FIG. 5 as follows.

Referring to FIG. 5, a master SI table includes location information for receiving each virtual channel map and version information of each virtual channel map. Each virtual channel map is uniquely identified via a virtual channel map identifier and the virtual channel map version indicates version information of the virtual channel map. In case that one of all tables connected in direction of arrow starting with the master SI table is changed, versions of all higher tables (up to master SI table) are incremented together with version increment of the corresponding table. Thus, by monitoring the master SI table, it is advantageous in that the change in the whole SI table can be directly checked.

For instance, in case that a change occurs in the source table, a version of the source table is incremented and a version of the virtual channel description table for referring to the source table is changed as well. Therefore, the change of the lower table causes a change of a higher table, whereby the version of the master SI table is eventually changed.

A single master SI table can exist per service provider. In case that a configuration of a service differs per region or subscriber (or subscriber group), the service provider designs a plurality of master SI tables to provide a customized service per unit. In case of this design, a customized service fit for a region of a subscriber, subscription information and the like can be efficiently provided via the master SI table.

The virtual channel map table can have at last one virtual channel and includes location information for obtaining channel detail information instead of having the channel detail information contained in the virtual channel map. The virtual channel description of the virtual channel map indicates a location of a virtual channel description table containing the channel detail information.

The virtual channel description table contains detail information of virtual channel. And, it is able to access the virtual channel description table using the virtual channel location in the virtual channel map table.

Meanwhile, a method of delivering the virtual channel description table can use one of the following four kinds of methods.

First of all, using a single global multicast stream, a virtual channel description table of all channels provided by the service provider is transmitted. According to this design, as mentioned in the foregoing description, the virtual channel map table needs not to indicate the address of the detail information per virtual channel but an address of the global multicast stream is just included in the provisioning information table.

Secondly, there is a method of providing a single multicast stream per region. This second method provides channel detail information using a separate multicast stream per region, while the aforesaid first method provides channel detail information using a single stream nationwide. In this case, since a region to which the ITF belongs can be specified via the service attachment procedure, it is possible to specify an address of a unique multicast stream per region via PROVISIONING information table.

Thirdly, there is a method of designating a virtual channel description location to a virtual channel map table. If it is able to receive detail information of channel belonging to one channel map at the same address entirely or in part, the detail information is just designated to a virtual channel map table once rather than designated per virtual channel description location. Yet, in case that there exists a channel necessary to obtain detail information at a different address, relevant information is designated to the virtual channel description location again.

Fourthly, referring to FIG. 5, there s a method of designating a location of detail information per channel using a virtual channel description location. A virtual channel service ID of a virtual channel description table is a unique identifier for discriminating a service corresponding to the virtual channel description. Using the virtual channel service ID, it is able to discover a virtual channel description table. In case that a plurality of virtual channel description tables are received by multicast, a multicast stream is joined and a virtual channel description table corresponding to the same virtual channel service ID is then discovered. In case that unicast scheme is applied, a parameter of the virtual channel service ID is transmitted to a server and a specific virtual channel description table is then received only.

The source table provides access information (e.g., IP address, port, AV codec, transport protocol, etc.) necessary for accessing a service actually per service.

The above described master SI table, virtual channel map table, virtual channel description table and source table are delivered via 4 logically separated flows and are available for push mode and pull mode both. Meanwhile, the master SI table monitors can be transmitted by multicast for version management and a version change is monitored by receiving a multicast stream.

Figure 6:
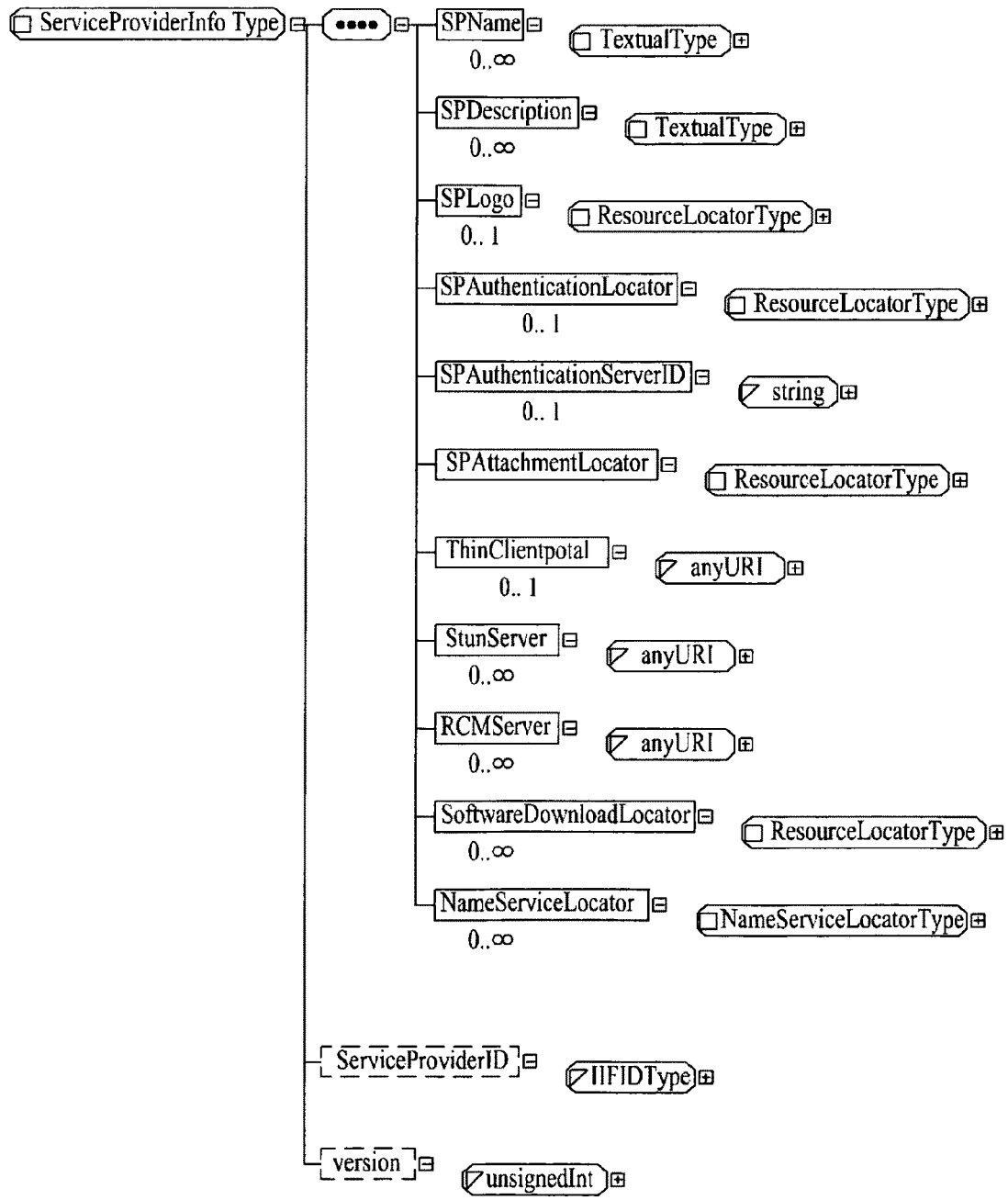
FIG. 6 is a diagram showing an example of service provider information according to an embodiment of the present invention.

FIG. 6 is a diagram showing an example of service provider information according to an embodiment of the present invention.

The above-described service provider information further includes, for example, a service provider ID, a version, an SP logo, an SP name, an SP description, an SP attachment locator, an SP authentication locator, etc.

The service provider ID is used to uniquely identify a service provider and may use a registered domain name.

The version indicates the version of the record of the service provider information.

The SP logo specifies the location of the logo image of the service provider and is selectively used.

The SP name indicates the name of the service provider and may have one name with respect to each language.

The SP description indicates the detailed text description of the service provider and may be provided for each language.

The SP attachment locator specifies the address of the service attachment server of the service provider. Meanwhile, a service attachment process necessary for starting the service of the SP is performed through the server.

The SP authentication locator specifies the address of a server to be accessed when a selectively usable authentication process is used.

Figure 7:
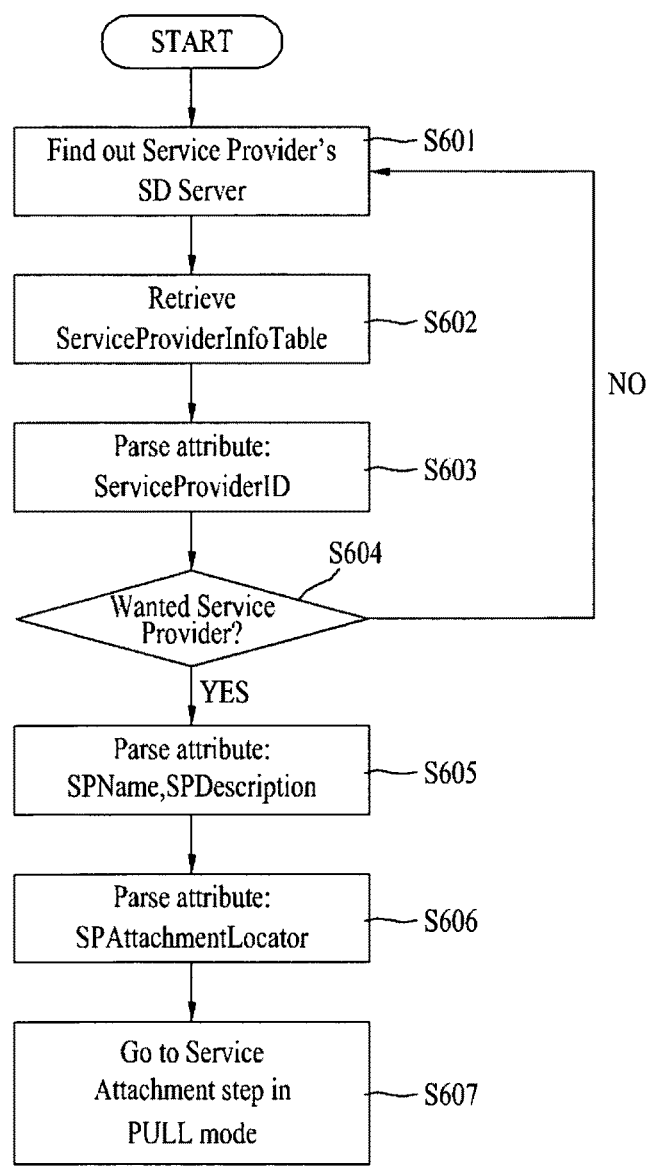
FIG. 7 is a diagram showing a process of performing a service discovery operation in a network device according to an embodiment of the present invention.

FIG. 7 is a diagram showing a process of performing a service discovery operation in a network device according to an embodiment of the present invention.

The network device (e.g., an ITF) determines a service provider's SD server (S601). The network device retrieves a service provider information table (S602). The network device parses attribute on a service provider ID (S603). The network device determines whether it is a wanted service provider or not (S604).

The network device parses attribute on an SP name and an SP description (S605). The network device parses attribute on an SP attachment locator (S606). The network device proceeds to a service attachment step in pull mode (S607).

Figure 8:
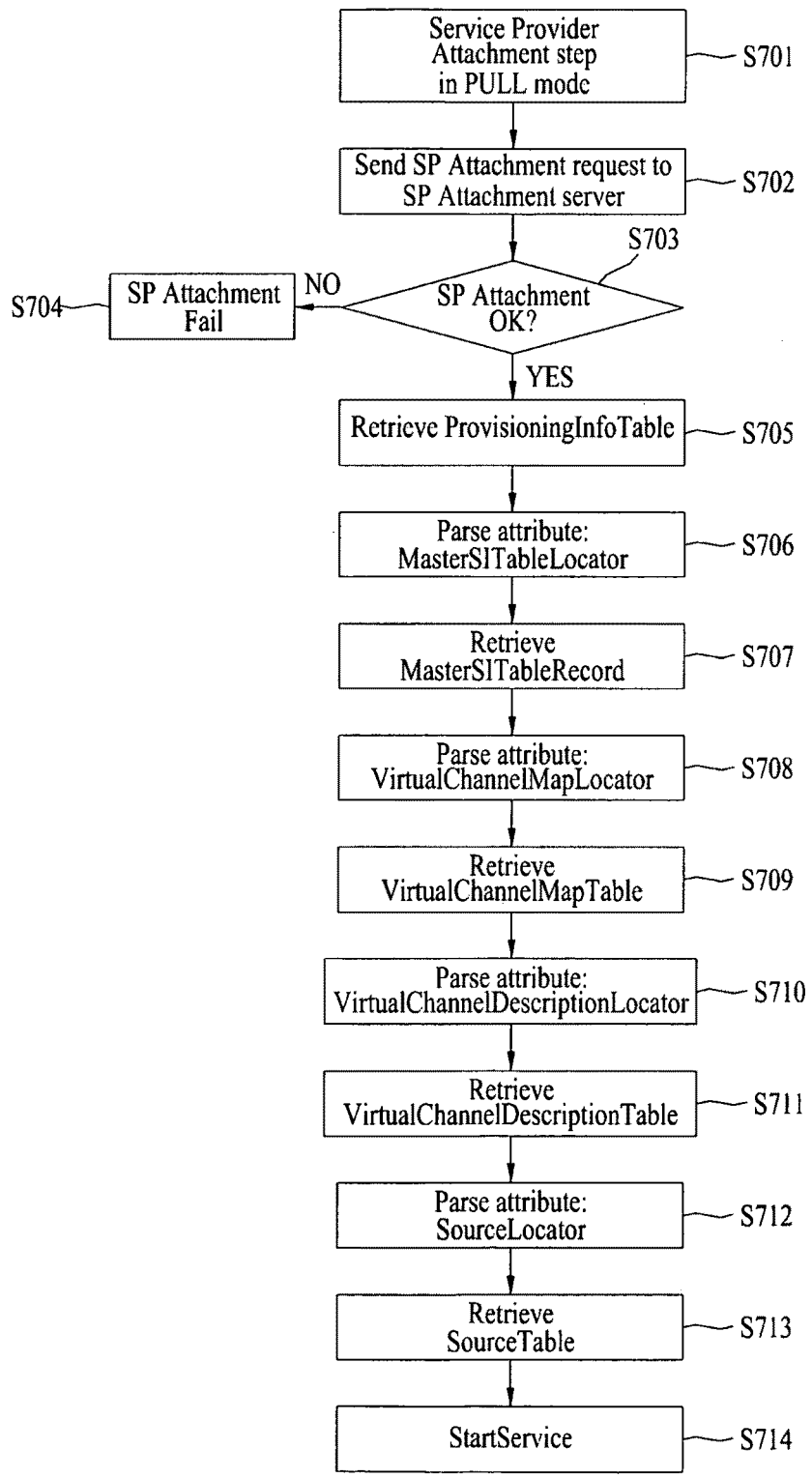
FIG. 8 is a diagram showing a process of performing a service discovery operation in a network device according to another embodiment of the present invention.

FIG. 8 is a diagram showing a process of performing a service discovery operation in a network device according to another embodiment of the present invention.

The flow of FIG. 8 may be, for example, performed after the steps of FIG. 7.

The network device performs a service provider attachment step in pull mode (S701). The network device sends an SP attachment request to an SP attachment server (S702). The network device determines whether SP attachment is OK (S703). If not, the network device recognizes that SP attachment has failed (S704). If yes, the network device retrieves a provisioning information table (S705). The network device parses attribute on a master SI table locator (S706). The network device retrieves a master SI table (S707). The network device parses attribute on a virtual channel map location (S708). The network device retrieves a virtual channel map table (S709).

Furthermore, the network device parses attribute on a virtual channel description locator (S710). The network device retrieves a virtual channel description table (S711). The network device parses attribute on a source locator (S712). The network device retrieves a source table (S713). The network device starts a service (S714).

FIG. 8 shows the steps of receiving SI information after service provider attachment. Based on the provisioning information table delivered after service provider attachment succeeds, the master SI table configured to suit a service subscriber is received so as to start SI reception. Furthermore, the SI information is received according to association between SI components from the master SI table to the source table.

Figure 9:
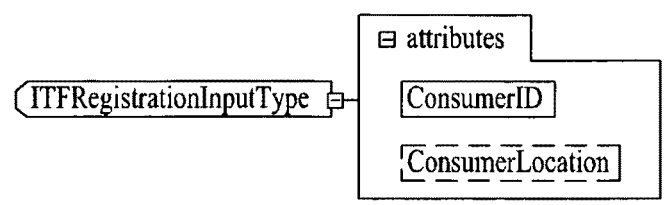
FIG. 9 is a diagram showing an example of registration input information according to an embodiment of the present invention.

FIG. 9 is a diagram showing an example of registration input information according to an embodiment of the present invention.

For service attachment, information transmitted from the network device (e.g., an ITF) to the service attachment server may be designed as shown in FIG. 9.

A consumer ID shown in FIG. 9 is an identifier for uniquely identifying a user and may be an ID Value applied by a service provider.

A consumer location shown in FIG. 9 indicates the location of the user. Using the consumer location, the service attachment server recognizes the location of the user and determines a zone in which the user is located. Further, according to the result, SI flow suitable for an ITF is selectively transmitted. The location information may be acquired through a DHCP option in the network attachment step.

In addition to the above-described information, information transmitted to the server for service attachment includes a device ID, a device cert ID, a vendor ID, a model ID, serial number information, and the like.

As the device ID, for example, the mac address of the ITF or the like may be used. The device cert ID is an identifier included for a security certificate of the ITF. The vendor ID is an identifier for uniquely identifying a terminal provider and may use a URL or the like. The model ID is a stream specified by a vendor and is an identifier for identifying the model of a terminal. The serial number is a unique identifier specified by the vendor.

Figure 10:
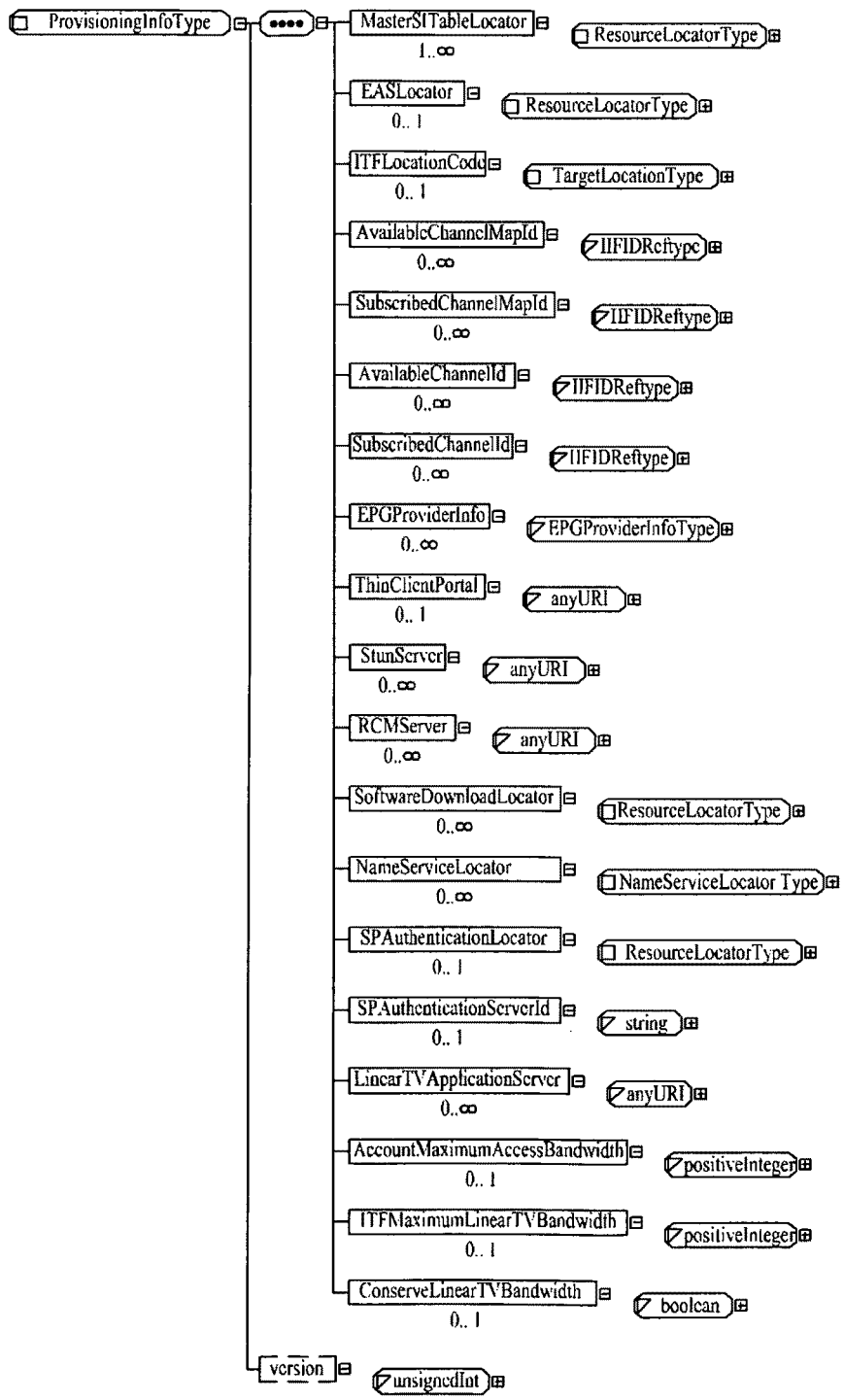
FIG. 10 is a diagram showing an example of provisioning information according to an embodiment of the present invention.

FIG. 10 is a diagram showing an example of provisioning information according to an embodiment of the present invention. Once service attachment has succeeded, the information transmitted from the service attachment server to the ITF may have, for example, a format shown in FIG. 10.

MasterSiTableLocator specifies the location of the master SI table.

SubscribedChannelMapId provides channel maps to which the user subscribes. The service provider provides channels provided by the service provider in the form of several channel maps so as to enable the user to select and subscribe to one or more channels. Alternatively, instead of the direct displaying of the channel maps to the user, the channel maps may be internally combined so as to provide a channel list, to which the user subscribes, as a combination of channel maps.

UnsubscribedChannelMapId indicates channel maps to which the user has unsubscribed. Since the user has unsubscribed to the channel maps, these channel maps cannot be currently viewed. However, such a channel list needs to be provided for promotion. The service provider selectively provides such channel maps.

EPGProviderInfo provides information about an EPG provider which provides EPG data. This includes an address capable of receiving EPG or the like. The EPG may be selectively provided and one or more EPGs may be provided.

RCMServer provides the address of a remote configuration server provided by the SP. If this address is present, the ITF necessarily accesses the remote configuration server so as to perform a remote configuration procedure.

The above table includes current Provisioning information of the Service Provider, and such information is largely divided into information (MasterSITable location, terminal support service list, overall service list, Thin client portal URI, or the like) associated with the service provided by the SP and information (STUN Information, remote control server address, Software download address, authentication service address, terminal location information) necessary for managing the terminal.

Figure 11:
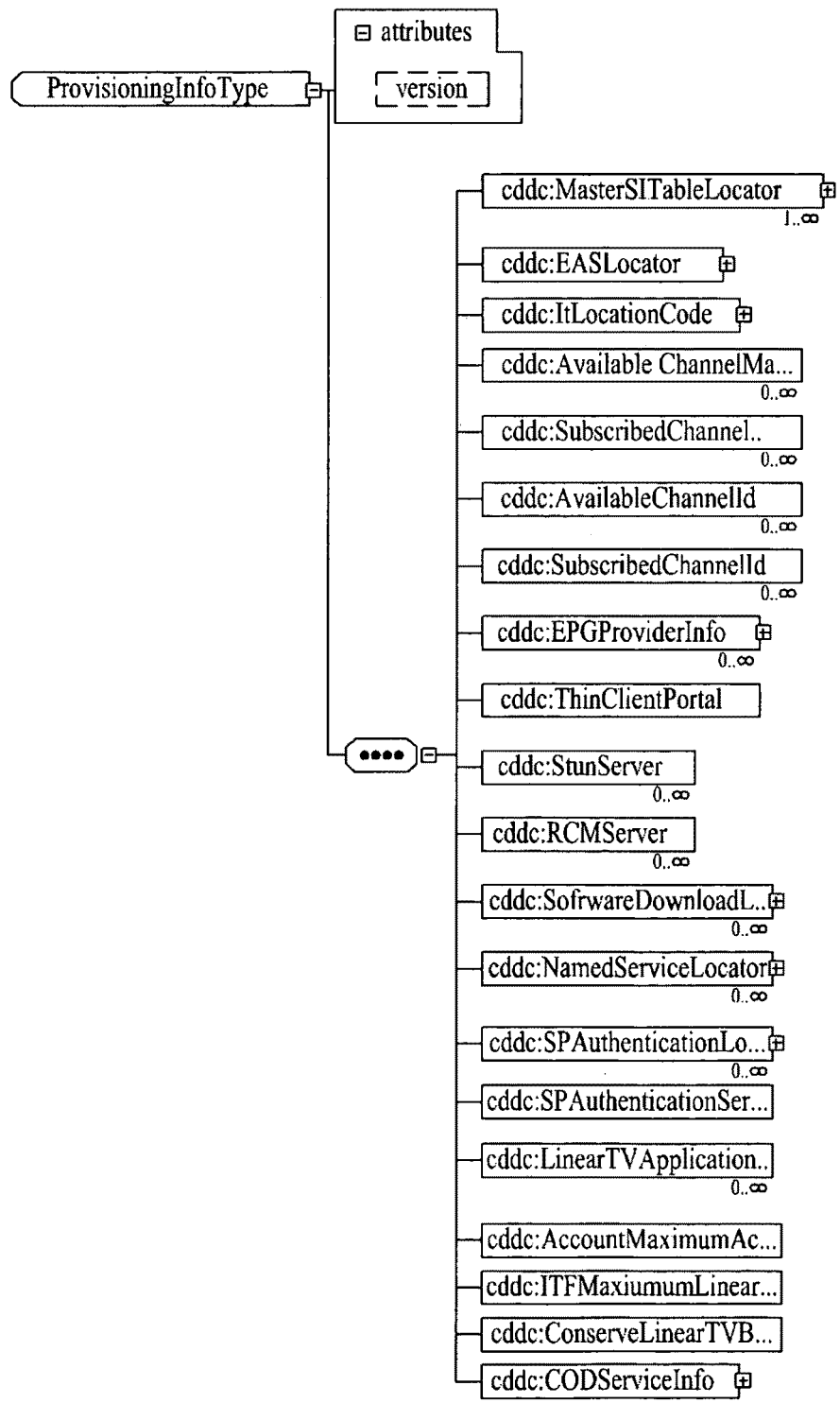
FIG. 11 is an example of provisioning information according to another embodiment of the present invention.
Figure 12:
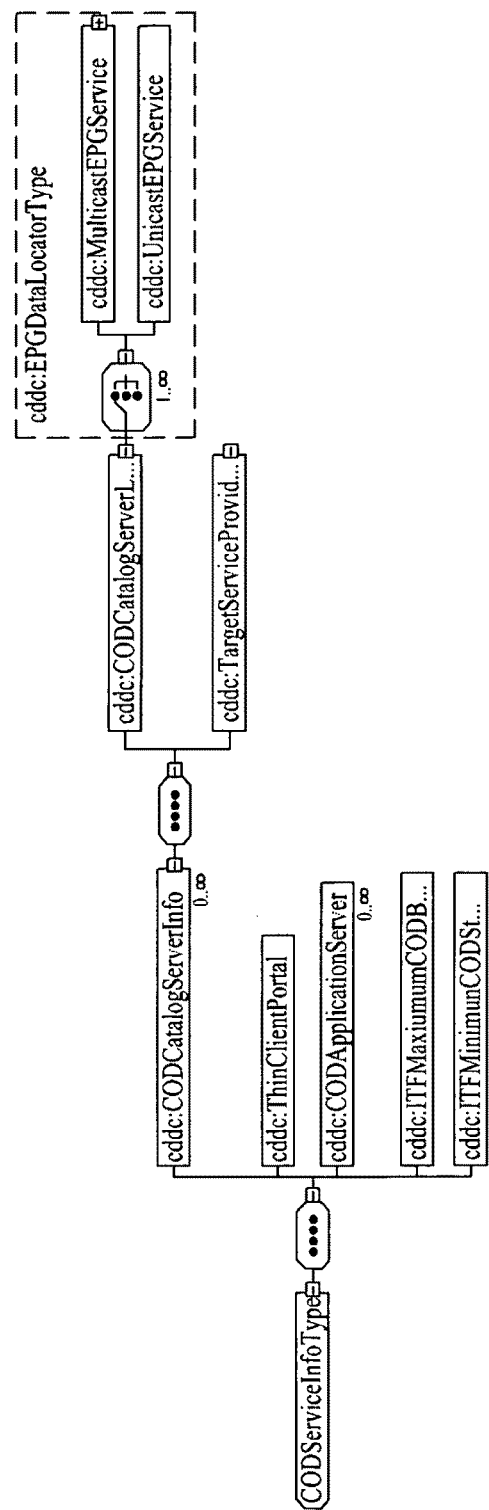
FIG. 12 is a diagram showing an example of COD service information designed according to FIG. 11.

FIG. 11 is an example of provisioning information according to another embodiment of the present invention. FIG. 12 is a diagram showing an example of COD service information designed according to FIG. 11. FIG. 13 is a diagram showing another example of COD service information designed according to FIG. 11.

First, as shown in FIG. 11, ProvisioningInfoType is extended to provide COD service-associated information. This information is an element of CODServiceInfoType of CODServiceInfo shown in FIG. 11, and information associated with the COD service is grouped and provided. FIGS. 12 and 13 show an embodiment of detailed XML schema of CODServiceInfoType.

CODCatalogServerInfo provides access information of the server for providing a COD catalog which is a set of Metadata information of COD contents. As a low-level element, TargetServiceProviderID may be selectively provided, and a ServiceProvider in which information provided by the CODCatalogServer is valid may be identified using TargetServiceProviderID. CODCatalogServer provided through the ProvisioningInfoTable can provide Content Metadata of all COD services provided by the service provider. If the COD content metadata storage space of the terminal is large enough to include all metadata, the terminal accesses CODCatalogServer provided through ProvisioningInfoTable and receives all COD content metadata provided by the service provider.

If the metadata storage space of the terminal is not sufficient, a method of receiving only metadata of the COD service which the user currently desires to navigate and performing navigation may be used. This may be supported by a catalog location provision method of each COD virtual channel.

ThinClientPortal provides a URI of a thin client portal for providing such a service if "thin client" which is a system for using a service through an HTTP browser is supported. ThinClientPortal URI included in CODServiceInfo in the ProvisioningInfoTable corresponds to a URI of a main page which can access all COD services of the service provider.

CODApplicationserver specifies the address of a specific application server for performing a "COD Application" Function.

The COD application function is a server-side function supporting browsing, searching, selecting and purchasing processes necessary for using a COD service, and can perform a content search/navigation/selection function and a content terms/payment/settlement function.

If this address is not specified, the SD server or the catalog server performs such a function or communication with the COD application server is transparently routed to the IPTV client.

ITFMaximumCODBandwidth may be selectively specified, and a maximum bandwidth of an access link to be used for using the COD service is specified.

ITFMinimumCODStorageSpace specifies a minimum size of a content storage space of the terminal necessary for using the COD service of the SP, if specified. If this value is not specified, it may be considered that a separate storage space used for the COD service is not necessary.

Figure 14:
FIG. 14 is a diagram showing an example of a master SI table according to an embodiment of the present invention.

FIG. 14 is a diagram showing an example of a master SI table according to an embodiment of the present invention.

FIG. 14 shows schema of MasterSITableRecordType. Master SI Table manages the list of all VirtualChanneMaps and the version thereof, and the ITF monitors this table so as to check whether or not SI information is updated.

ServiceProviderID attribute is an identifier for uniquely identifying the service provider and can use a registered domain name.

MasterSITableVersion indicates information indicating whether or not MasterSITable and low-level SI components are changed. By monitoring this version, it is possible to check whether or not overall SI information is updated.

VirtualChannelMapLocator provides access information capable of receiving VirtualChannelMap included in MasterSITable. If VirtualChannelMap specified through VirtualChannelMapLocator is updated, the version of MasterSITable is increased and the update thereof is signaled.

Figure 15:
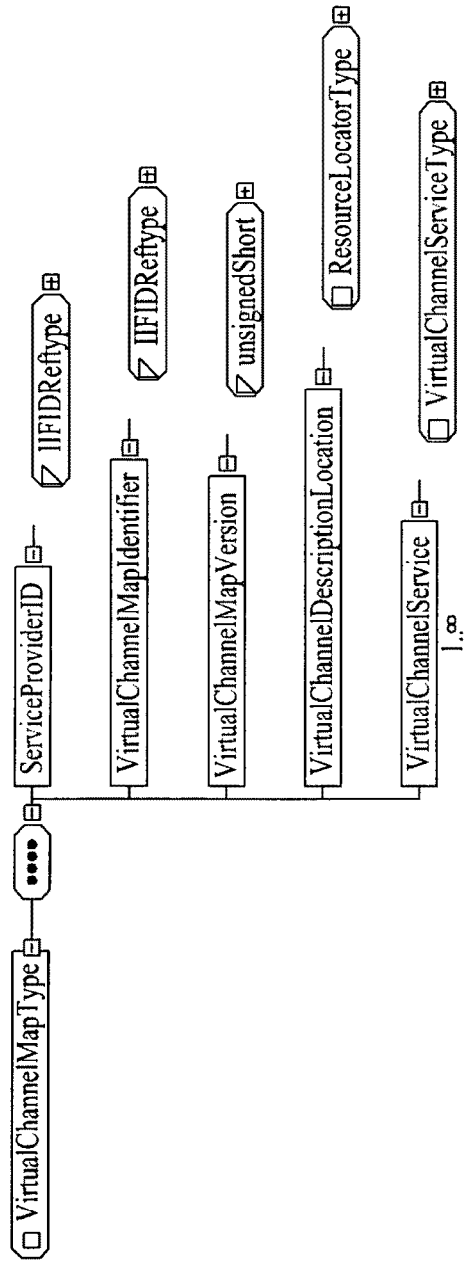
FIG. 15 is a diagram showing an example of a virtual channel map according to an embodiment of the present invention.

FIG. 15 is a diagram showing an example of a virtual channel map according to an embodiment of the present invention.

FIG. 14 shows a schema of VirtualChannelMapType. As the structure including the virtual channel list, the detailed information of the channel is not included and address information capable of receiving the detailed information is separately provided. It functions as a package of a group of channels.

ServiceProviderID attribute is an identifier for uniquely identifying the service provider and can use a registered domain name.

VirtualChannelMapIdentifier is an identifier for uniquely identifying VirtualChannelMap.

VirtualChannelMapVersion indicates a change in channel lists of the channel maps and is changed if a channel is added or deleted.

VirtualChannelDescriptionLocation element includes basic location information of the detail information of each channel.

VirtualChannelService indicates services included in VirtualChannelMap.

Figure 16:
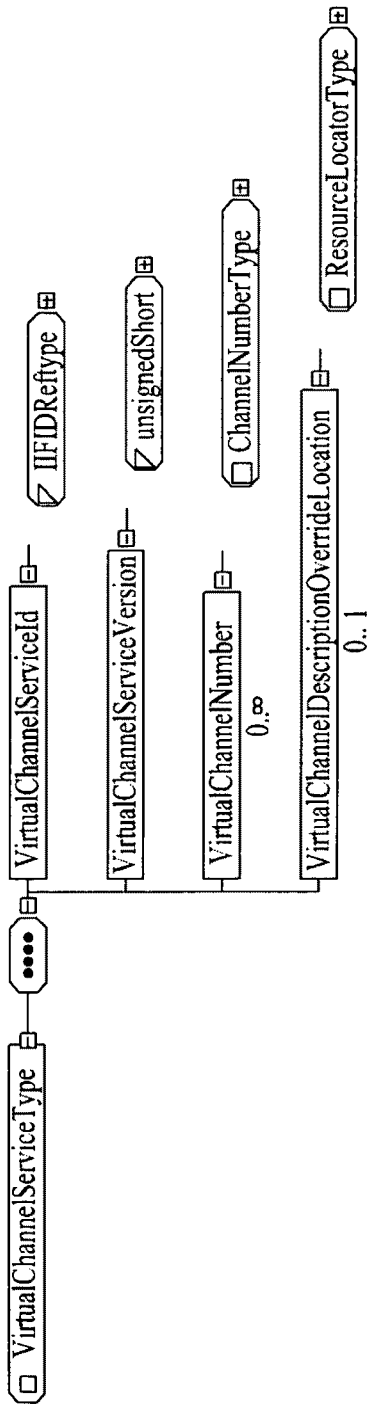
FIG. 16 is a diagram showing an example of a virtual channel service according to an embodiment of the present invention.

FIG. 16 is a diagram showing an example of a virtual channel service according to an embodiment of the present invention.

FIG. 16 shows schema of VirtualChannelServiceType. As the structure including the basic information of the virtual channel service included in the virtual channel map, the detailed information of the channel is not included.

VirtualChannelServiceID is an identifier for uniquely identifying the service.

VirtualChannelserviceVersion is increased when the description of the Virtual Channel is changed, and the update thereof is signaled.

VirtualChannelNumber can specify the virtual channel number allocated to each service.

VirtualChannelDescriptionOverrideLocation overrides the location value set to a high level and specifies a new location, in case of the virtual channel which should receive the detailed description at a location different from VirtualChannelDescriptionLocation specified in VirtualChannelMap.

Figure 17:
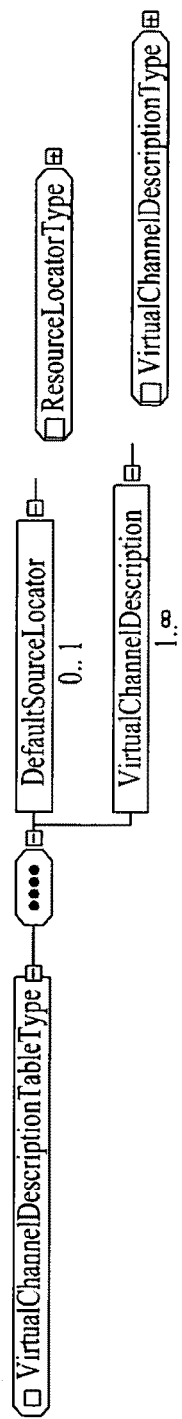
FIG. 17 is a diagram showing an example of a virtual channel description table according to an embodiment of the present invention.

FIG. 17 is a diagram showing an example of a virtual channel description table according to an embodiment of the present invention.

FIG. 17 shows XML schema of VirtualChannelDescriptionType. This is a table structure including the detailed description of each virtual channel.

DefaultSourceLocation specifies the address of a SourceTable for providing media source information applicable to all VirtualChannels. Each VirtualChannel may use a basic source address specified by this value as an address for acquiring a source or may specify a separate address and override this value.

VirtualChannelDescription is an element including the description of each VirtualChannel and has a VirtualChannelDescriptionType.

Figure 18:
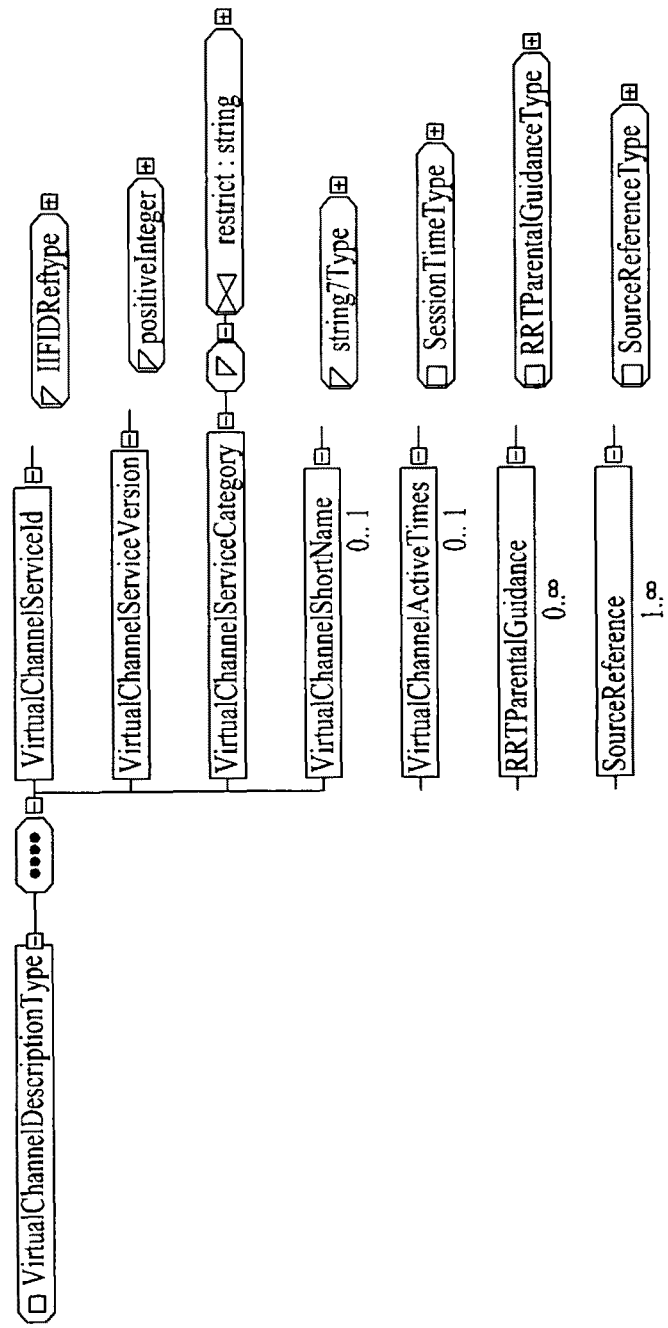
FIG. 18 is a diagram showing an example of virtual channel description according to an embodiment of the present invention.

FIG. 18 is a diagram showing an example of virtual channel description according to an embodiment of the present invention.

FIG. 18 shows XML schema of the VirtualChannelDescriptionType.

VirtualChannelServiceID is an identifier for uniquely identifying the virtual channel.

VirtualChannelServiceVersion indicates the version of the VirtualChannelDescription element and should be increased whenever the VirtualChannelDescription element is changed.

VirtualChannelServiceCategory indicates the service type of a channel and indicates whether the channel is a Linear TV channel or a COD Service channel.

The VirtualChannelShortName element is a shot text value of 7 letters or less and indicates the name of the channel. For example, a value of "WABC" may be used.

SourceReference provides information about the media source of VirtualChannelService. Access information necessary for using the VC can be acquired through this element, and one or more pieces of information must be present.

Figure 19:
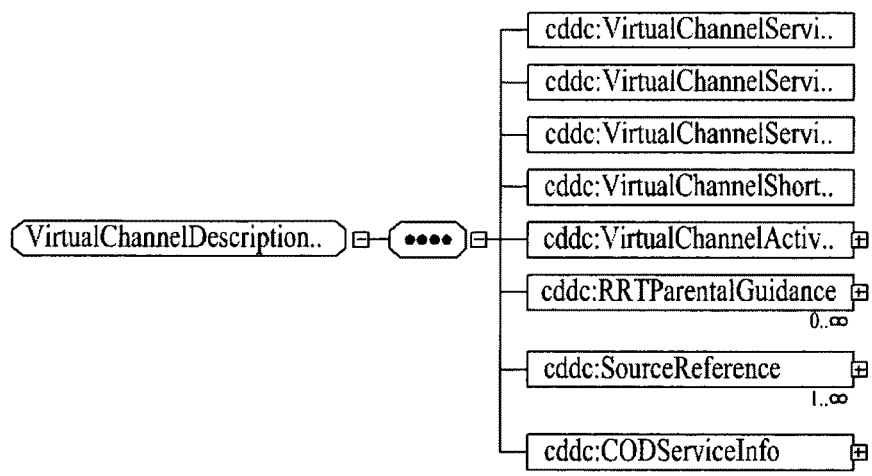
FIG. 19 is a diagram showing an example of virtual channel description according to another embodiment of the present invention.

FIG. 19 is a diagram showing an example of virtual channel description according to another embodiment of the present invention.

The above VirtualChannelDescription table is currently limited to a linear TV service which is a real-time broadcast channel service and is extended for a Content On Demand (COD) service in the present invention.

First, as shown in FIG. 19, the VirtualChannelDescriptionType is extended to provide COD service-associated information. This information is an element of CODServiceInfoType of CODServiceInfo shown in FIG. 19, and information associated with the COD service is grouped and provided.

CODCatalogServerInfo provides access information of the server for providing a COD catalog which is a set of metadata information of COD contents. As a low-level element, TargetServiceProviderID may be selectively provided and ServiceProvider in which information provided by the CODCatalogServer is valid may be identified through the TragetServiceProviderID.

CODCatalogServer provided through VirtualChannelDescriptionType is a server for providing information about a specific VirtualChannel Service, and COD metadata can be provided through a separate COD CatalogServer according to the COD VirtualChannel service. Accordingly, a receiver may selectively receive and use only services, to which the receiver subscribes, or metadata of a COD service to be currently accessed and used.

ThinClientPortal provides a URI of a Thin Client Portal for providing such a service if "thin client" which is a system for using a service through a HTTP Browser is supported. ThinClientPortal URI included in CODServiceInfo on VirtualChannelDescriptionType is treated as a URI of a specific service page which can access VirtualChannel Service described by VirtualChannelDescriptionType.

CODApplicationServer specifies the address of a specific application server for performing a "COD application" Function.

The COD application function is a server-side function supporting browsing, searching, selecting and purchasing processes necessary for using a COD service, and can perform a content search/navigation/selection function and a content terms/payment/settlement function.

If this address is not specified, the SD server or the catalog server performs such a function or communication with COD Application Server is transparently routed to the IPTV client.

In CODApplicationServer provided through VirtualChanneldescriptionType, if a service is provided through a separate COD application server according to VirtualChannel service, it is signaled.

Figure 20:
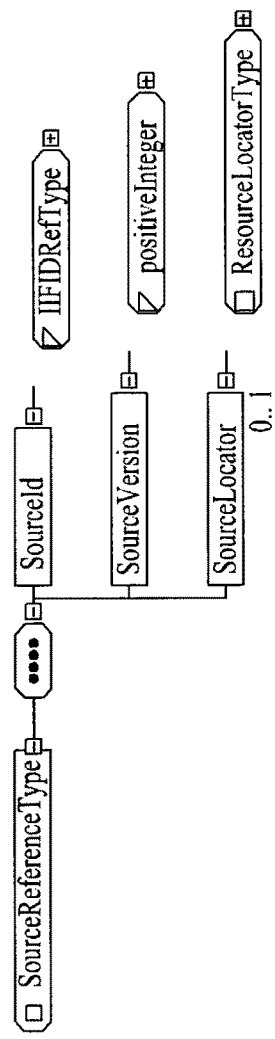
FIG. 20 is a diagram showing an example of a source reference according to an embodiment of the present invention.

FIG. 20 is a diagram showing an example of a source reference according to an embodiment of the present invention.

FIG. 20 shows XML schema of SourceReferenceType. This is a structure for referencing a Source Element including media source information of the VirtualChannel Service.

SourceID is an identifier for identifying the referenced Source element.

SourceVersion is the version of the referenced Source element.

SourceLocator provides a location capable of receiving the referenced Source element. If DefaultSourceLocator and this element are simultaneously present, this element overrides the default value.

Figure 21:
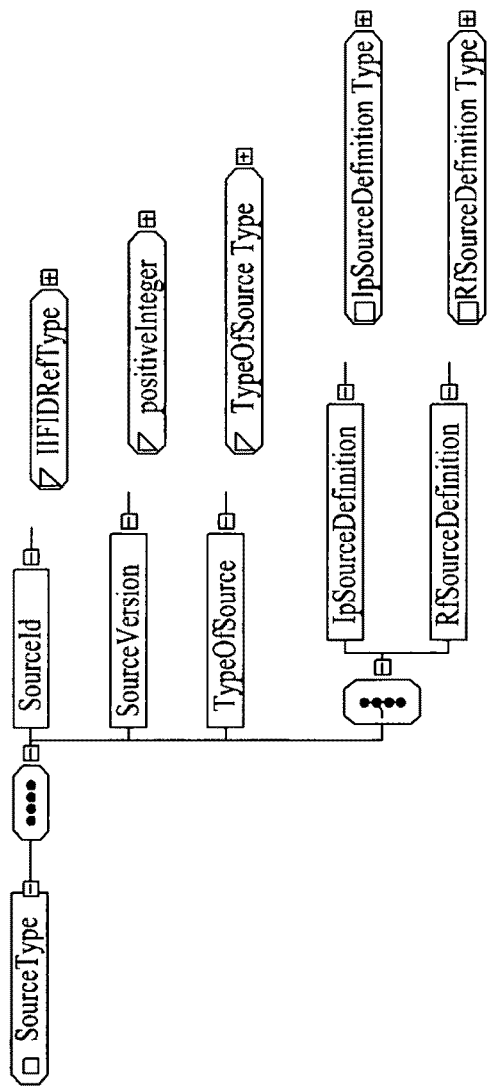
FIG. 21 is a diagram showing an example of a source according to an embodiment of the present invention.

FIG. 21 is a diagram showing an example of a source according to an embodiment of the present invention.

FIG. 21 shows XML schema of SourceType, which includes information necessary for a media source of VirtualChannelService.

SourceId is an identifier for identifying a referenced Source element. This identifier should uniquely identify this Source element.

SourceVersion is the version of the referenced Source element. This value should be increased whenever the contents of the Source element are changed.

TypeOfSource element is a value indicating the type of the source and may have an attribute such as HD, SD, PIP, Barker, or the like.

A barker channel is an advertisement or publicizing channel and is automatically selected when a channel cannot be viewed due to absence of the right to view the channel. In addition, this channel publicizes the channel and guides subscription.

IPSourceDefinition provides access information of a media source delivered through an IP network and may indicate Multicast IP addresses, transmission protocols, and various parameters.

RfSourceDefinition provides access information of a media source delivered through a cable TV network.

Figure 22:
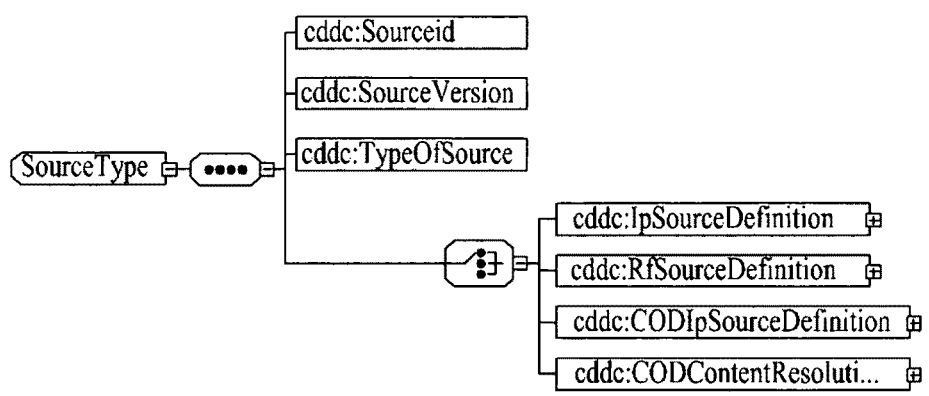
FIG. 22 is a diagram showing an example of a source according to another embodiment of the present invention.
Figure 24:
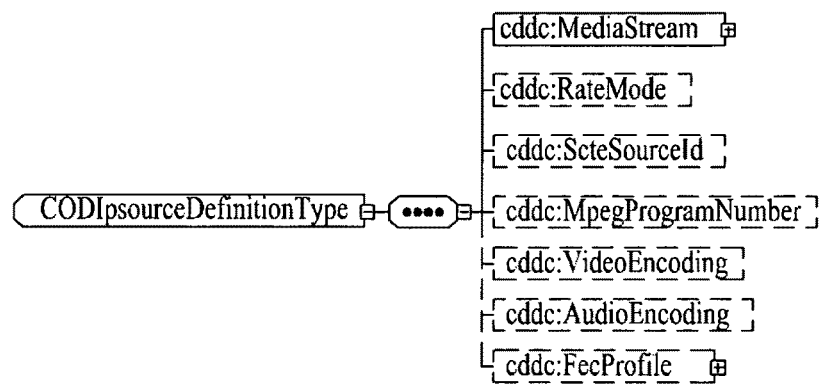
FIG. 24 is a diagram showing an example of COD Ip source definition according to an embodiment of the present invention.
Figure 25:
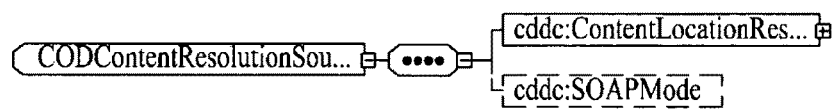
FIG. 25 is a diagram showing an example of COD content resolution source definition according to an embodiment of the present invention.

FIG. 22 is a diagram showing an example of a source according to another embodiment of the present invention. FIG. 23 is a diagram showing an example of type of source according to an embodiment of the present invention. FIG. 24 is a diagram showing an example of COD Ip source definition according to an embodiment of the present invention. FIG. 25 is a diagram showing an example of COD content resolution source definition according to an embodiment of the present invention.

The existing SourceType is currently limited to a linear TV service which is a real-time broadcast channel service, and is extended for a Content On Demand (COD) service in the present invention.

First, as shown in FIG. 22, SourceType is extended so as to provide COD service-associated information. This information includes two elements: CODIPSourceDefinition and CODContentResolutionSourceDefinition, as shown in FIG. 22.

CODIPSourceDefinition includes parameters necessary for acquiring a media source when the media source of the COD VirtualChannel Service is provided through an IP network, and the COD content can be directly accessed through CODIPSourceDefinition. In case of using CODIPSourceDefinition, information necessary for acquiring the media source according to instances of the content may be composed of a separate Source Element.

That is, if content "Spider-man" is provided using two versions of HD and SD, it may be considered that the content is composed of a separate Source element according to instances so as to be provided. Even in the same version, if an area where the user is located is varied, a separate server may provide the content. In this case, using a separate source element, acquisition information of different content may be provided according to areas.

In this case, the source element may provide access information of one instance of the content. The XML schema thereof is shown in FIG. 24.

MediaStream is ResourceLocation type, which indicates access information of a Media source.

CODContentResolutionSourceDefinition does not directly provide access information of one content instance, but signals the address of the content location resolution server which can obtain information capable of acquiring all content of the COD VirtualChannel Service by performing a query, unlike the case of CODIPSourceDefinition. In this case, unlike above, the COD content cannot be directly accessed through the source element, the content location resolution server specified by the source element is accessed, the location of content which is desired to be consumed is queried so as to acquire access information, and the content is acquired based on the location of the content.

This is advantageous in that the amount of signaling data is reduced since one source element is not necessary for each content instance but one source element is necessary per service, and is disadvantageous that additional transaction is necessary for acquiring the access information of the content.

The XML schema thereof is shown in FIG. 25.

ContentLocationResolutionServerLocator is a Resource Locator type, which provides the access information of a server capable of acquiring the location of the content by performing a query. The query may be requested by transmitting the identifier of the content and the user information as parameters using an HTTP method. Alternatively, the content location resolution result of all content within the service is configured in the form of a defined content referencing table of TV Anytime, is transmitted using a multicast method, and is stored in the terminal, and the result is locally inquired.

If a SOAPMode element is present and the value is true, a SOAP-based Query method may be used.

In addition, in order to signal source information of the COD content, TypeOfSource is extended so as to identify the source of the COD Content. This is shown in FIG. 23.

If TypeOfSource is CODContentHD or CODContentSD, the source element indicates access information of a specific COD Content instance. CODContentHD indicates HD-class COD Content and CODContentSD indicates SD-class COD Content.

If TypeOfSource is CODContentLRServerLocator, the source element signals the location of content belonging to the COD service, that is, the address of the server capable of acquiring access information.

Figure 26:
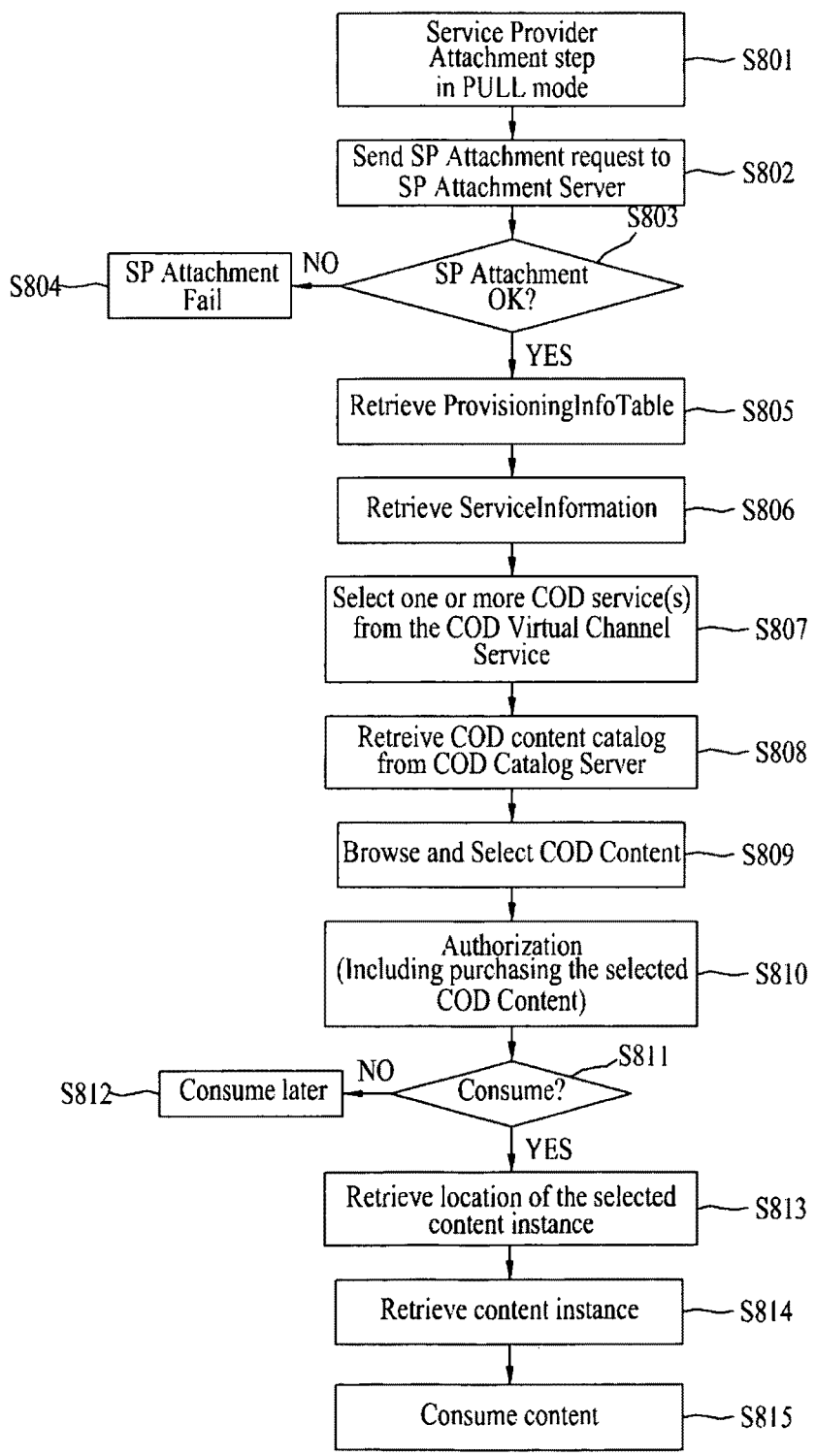
FIG. 26 is a diagram showing a process of processing metadata at a thick client according to an embodiment of the present invention.

FIG. 26 is a diagram showing a process of processing metadata at a thick client according to an embodiment of the present invention.

Figure 27:
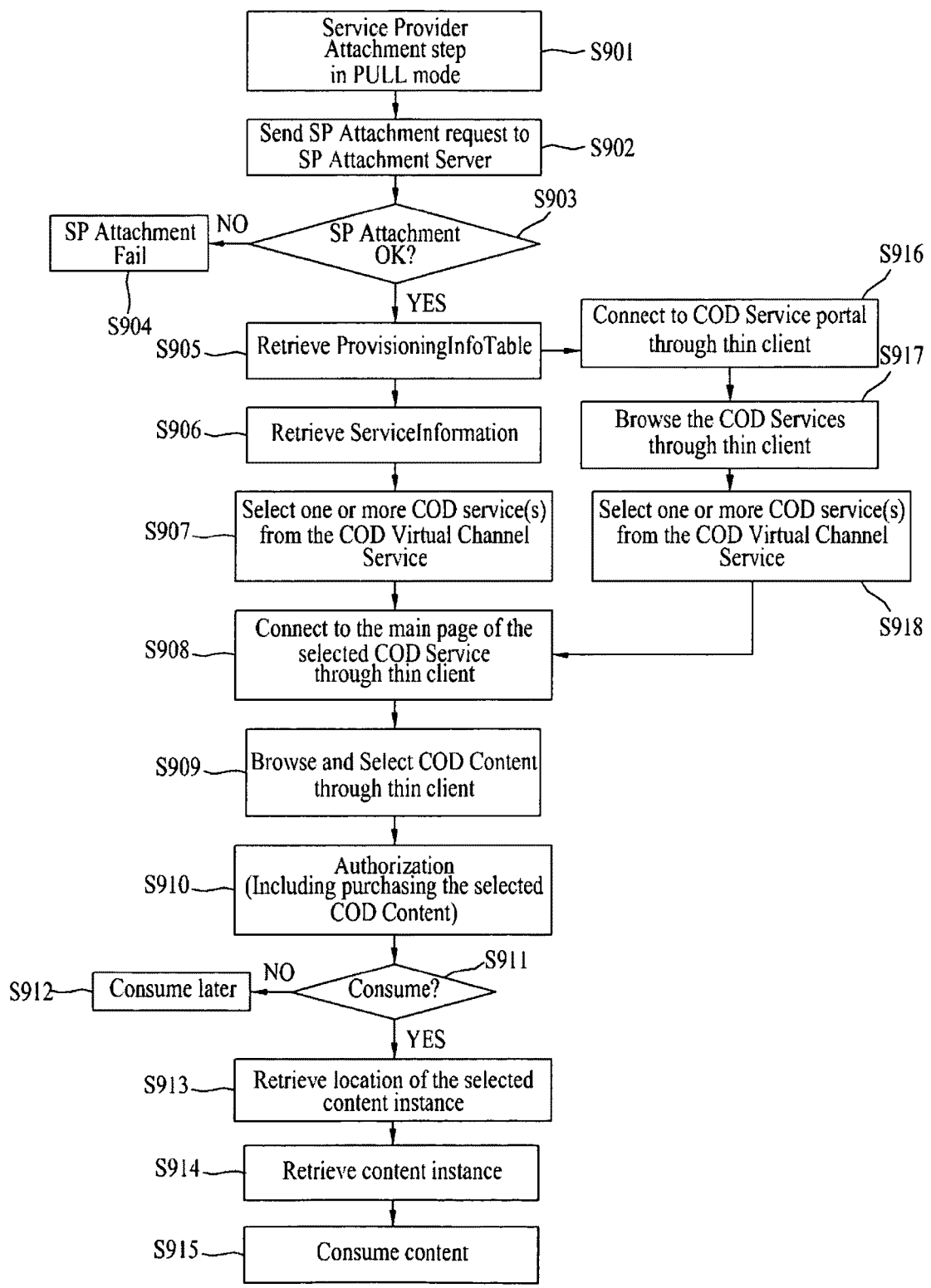
FIG. 27 is a diagram showing a process of processing metadata at a thin client according to an embodiment of the present invention.

FIG. 27 is a diagram showing a process of processing metadata at a thin client according to an embodiment of the present invention.

FIG. 26 is a diagram showing a process of processing metadata at a thick client according to an embodiment of the present invention. The flow of FIG. 8 indicates the flow of processing a COD service at a thick client.

The network device performs a service provider attachment step in pull mode (S801). The network device sends an SP attachment request to an SP attachment server (S802). The network device determines whether SP attachment is OK or not (S803). If not, the network device recognizes that the SP attachment has failed (S804). If yes, the network device retrieves a provisioning information table (S805). The network device retrieves service information (S806). The network device selects one or more COD services from the COD virtual channel services (S807).

The network device retrieves a COD content catalog from a COD catalog server (S808). The network device browses and selects COD content (S809). The network device performs authorization including purchasing the selected COD content (S810).

Moreover, the network device determines whether the content will be consumed (S811). If not, the network device will consume the content later (S812). If yes, the network device retrieves the location of the selected content instance (S813). The network device retrieves the content instance (S814). The network device consumes the content (S815).

FIG. 27 is a diagram showing a process of processing metadata at a thin client according to an embodiment of the present invention.

The flow of FIG. 27 indicates the flow of processing a COD service at a thin client.

The network device performs a service provider attachment step in pull mode (S901). The network device sends an SP attachment request to an SP attachment server (S902). The network device determines whether SP attachment is OK or not (S903). If not, the network device recognizes that the SP attachment has failed (S904). If yes, the network device retrieves a provisioning information table (S905). The network device retrieves service information (S906). The network device selects one or more COD services from the COD virtual channel services (S907).

The network device is connected to the main page of the selected COD service through the thin client (S908). The network device browses and selects COD content through the thin client (S909). The network device performs authorization including purchasing the selected COD content (S910).

Moreover, the network device determines whether the content will be consumed (S911). If not, the network device will consume the content later (S912). If yes, the network device retrieves the location of the selected content instance (S913). The network device retrieves the content instance (S914). The network device consumes the content (S915).

Furthermore, the network device is connected to the COD service portal through the thin client after step S905 (S916). The network device browses the COD services through the thin client (S917). The network device selects one or more COD services from the COD virtual channel services (S918).

FIG. 26 shows the operation of the thick client for receiving and processing metadata. In contrast, FIG. 27 shows the operation of the thin client accessed and used through a client function such as a web browser in a state in which some of the metadata is left in the server.

In the thick client, service information is received and SI metadata is processed. Then, a COD virtual channel service is selected from the processed metadata such that the COD service begins to be used. In order to acquire a COD content list and detailed information included in the COD service, the address of the COD catalog server is acquired. Then, the address is accessed so as to acquire content catalog information. Thereafter, content to be consumed is selected through a browsing, navigation and searching process using the acquired COD catalog information, and consumption right is then acquired through an authorization process. The authorization process may include processes such as purchasing and usage terms/payment/settlement. After the consumption right is acquired, the location information of the instance of the content to be actually consumed is acquired, and the content instance is accessed and consumed based on the acquired information.

In the thin client, access to the COD service portal may be largely divided into two methods.

In a first method, a COD service main portal page providing access to all COD services specified in a provisioning information table is accessed so as to use a service.

In a second method, a COD service is selected based on received SI information, a portal page of the COD service is directly accessed in order to use the selected COD Service, and the service is used.

In both the first and second methods, after the service is selected, the content is selected, the rights are acquired, and the content is consumed through content catalog browsing, navigation and searching using the thin client.

In the above description, the method of browsing the COD content catalog includes the following three methods. The method is not limited thereto. The term "browsing" includes at least one of navigation and searching and may indicates a series of processes of finding desired content using the content catalog.

First, the thin client browses the COD content catalog by exchanging an HTML-based web page between the server and the terminal. That is, since the metadata of the content is present at the server side, the thin client receives the web page including UI and data and performs browsing.

Second, a medium-level client stores a small amount of content metadata in the client using various delivery mechanisms and locally performs browsing using the content metadata. If additional metadata is necessary, the additional metadata is received from the server.

Third, a high-level client receives and stores the overall COD content catalog and performs local browsing.

Hereinafter, the metadata delivery mechanism necessary for the above-described browsing method will be described.

In addition, purchasing is performed through the authorization process, and, thereafter, information about the purchased content is stored in profile information of the user. The user may directly consume the content immediately after upon purchase or consume the content using another device later. By managing purchasing list information through the profile of the user, a device used upon purchasing and a device used upon consuming can be separated.

When the purchased content is consumed, it is necessary to acquire the access information of the consumable instance of the actual content based on a globally unique content ID which is the unique identifier of the purchased content. Accordingly, in the method proposed by one embodiment of the present invention, the actual content instance is determined through the above-described source table.

Figure 28:
FIG. 28 is a diagram showing a data structure of provisioning information according to an embodiment of the present invention.

Currently, since the schema of ProvisioningInfoType is configured only for linear TV, information associated with a LinearTV service is located at the low level of ProvisioningInfoType. In this case, if information about a COD service is added, the information associated with the LinearTV service and the information about the COD service may not be distinguished from each other. Accordingly, as shown in FIG. 28, the information associated with the Linear TV service is grouped to a separate element "LinearTVServiceInfo" so as to be provided. Since associated information can be grouped, it is possible to facilitate management of the information.

In the above description, the method of providing the COD service information through ProvisioningInfoTable was proposed. A COD catalog server address and a thin client portal of the COD service information may be delivered using EPG provider information and thin client portal information. If this method is used, two pieces of information are omitted in CODServiceInfo included in the proposed ProvisioningInfo and are provided using the following method.

Figure 29:
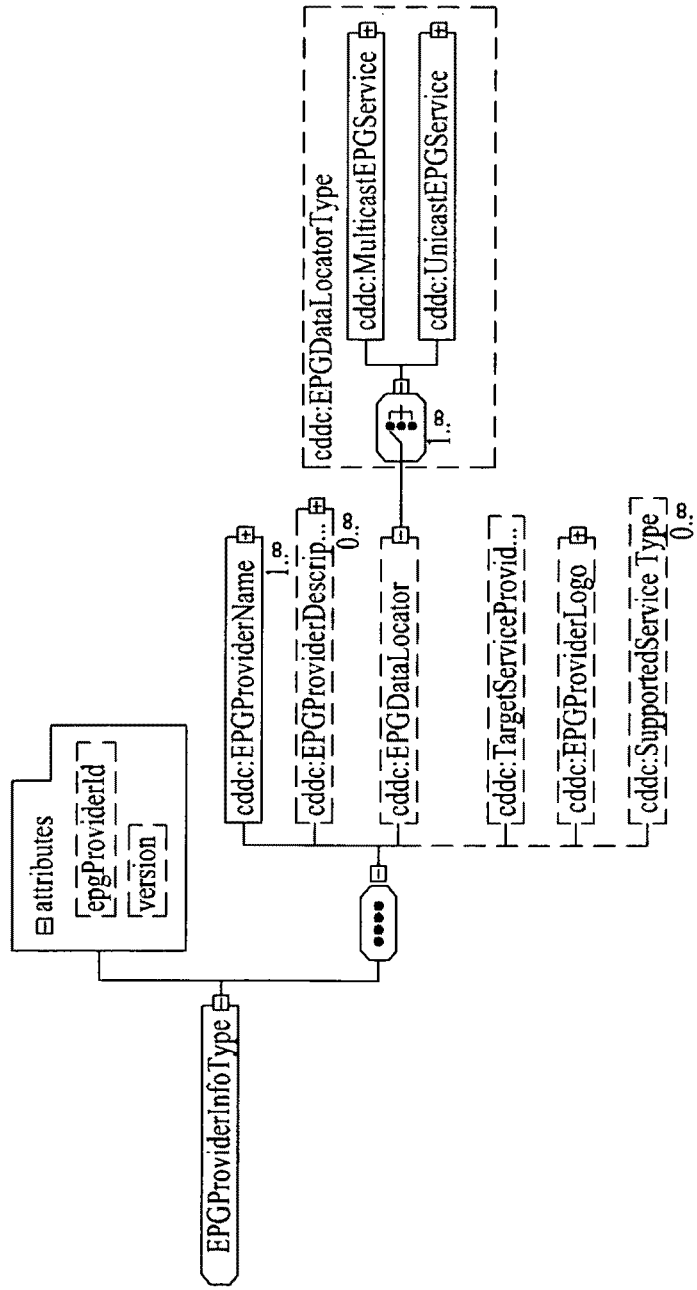

FIGS. 29 and 30 are diagrams showing a data structure of EPG provider information according to an embodiment of the present invention.

FIG. 31 is a diagram showing a data structure of type of supported service according to an embodiment of the present invention.

FIGS. 29 and 30 show EPGDiscoveryRecordType schema, which provides information necessary for receiving EPG data.

EPGProviderID is an identifier for uniquely identifying a provider for providing EPG. A registered domain name may be used.

Version indicates the version of an EPGDiscoveryRecord.

EPGProviderName indicates a text name of an EPG provider and may be provided for each language.

EPGProviderDescription includes detailed text description of the EPG provider and may be provided for each language.

EPGDataLocation signals an IP address and protocol capable of receiving EPG data.

TargetServiceProviderID describes the IDs of the IPTV SP supported by the EPG provider.

EPGProviderLogo provides a URI of a logo of the EPG provider.

In FIGS. 29 and 30, EPGProviderInfoType defined for Linear TV is extended and an element "SupportedServiceType" is added. This indicates the types of services including EPG metadata provided by the EPG provider and may indicate whether the EPG metadata of all the services is provided or information about a specific service (e.g., Linear TV and/or COD Service) is provided. As shown in FIGS. 29 and 30, this is performed by adding an element "TypeOfSupportedService", which has TypeOfSupportedServiceType shown in FIG. 31. If the EPG metadata for all types of services is provided, the "ALL" value may be used, and, if information about LinearTV is provided, a Linear TV value may be used. In addition, if information about the COD service is provided, a COD service value may be used. Since SupportedServiceType may have a value of 0 to infinite, all supported service types may be signaled.

Based on such information, the receiver may identify the EPG provider for providing the EPG metadata for the COD service, access the necessary EPG Provider based on the identification result, and receive the EPG metadata. This is equally applicable to the case where information about a service other than the COD service is necessary.

Figure 32:
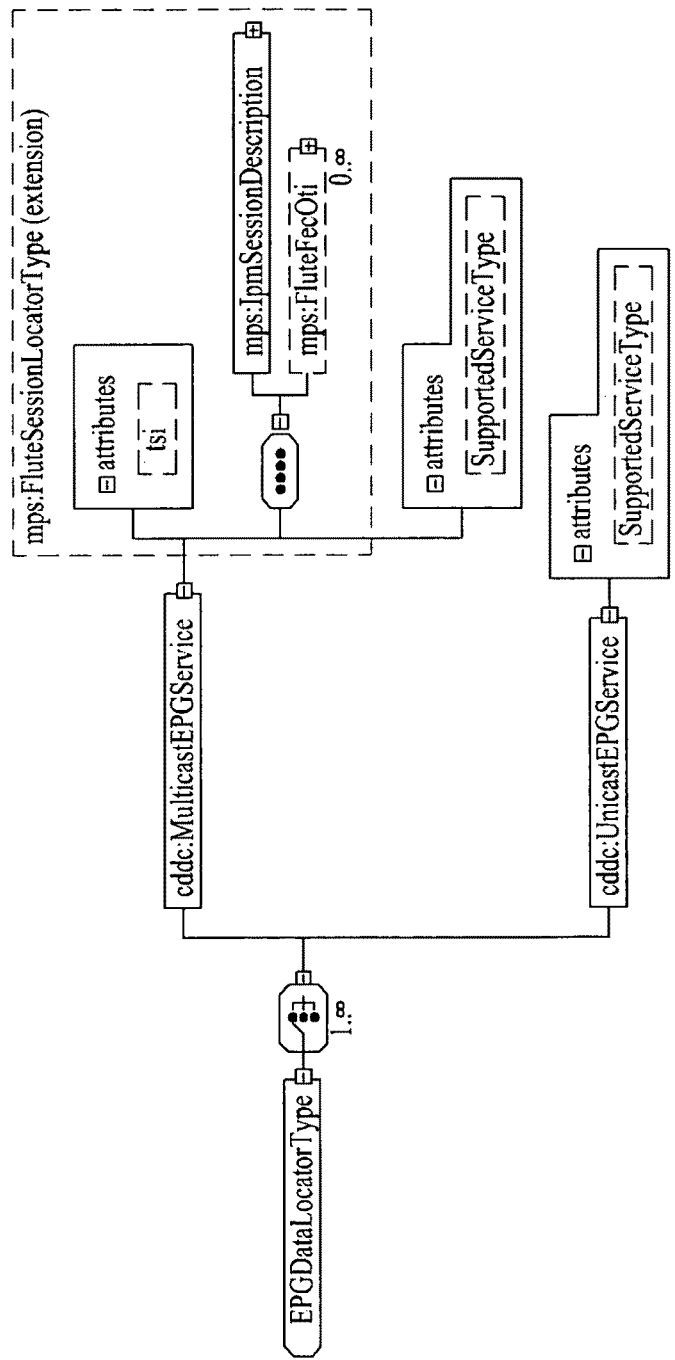

FIGS. 32 and 33 are diagrams showing a data structure of an EPG data locator according to an embodiment of the present invention.

It is possible to provide n locations of EPG data provided by the EPG provider through EPGProviderInfo. In this case, the types of provided EPG data are varied according to the EPG data locations. In order to signal this information, EPG-DataLocator is extended as shown in FIGS. 32 and 33.

The EPG metadata may be transmitted using FLUTE in a multicast or unicast mode. In the case where the EPG metadata is transmitted in the multicast mode, the EPG metadata is signaled through MulticastEPGService and, in the case where the EPG metadata is transmitted in the unicast mode, the EPG metadata is signaled through UnicastEPGservice. By adding SupportedServiceType attribute to each element, the type of the service supported by each stream is signaled. Although SupportedServiceType is added as the attribute in the present embodiment, a low-level element may be added. In this case, a plurality of supported services may be signaled as added to EPGProviderInfo.

Based on such information, the receiver may identify the EPG data location for providing the EPG metadata for the COD service. Based on the identification result, a necessary EPG Data location may be accessed and the EPG metadata may be received. This is equally applicable to the case where information about a service other than the COD service is necessary.

Figure 34:
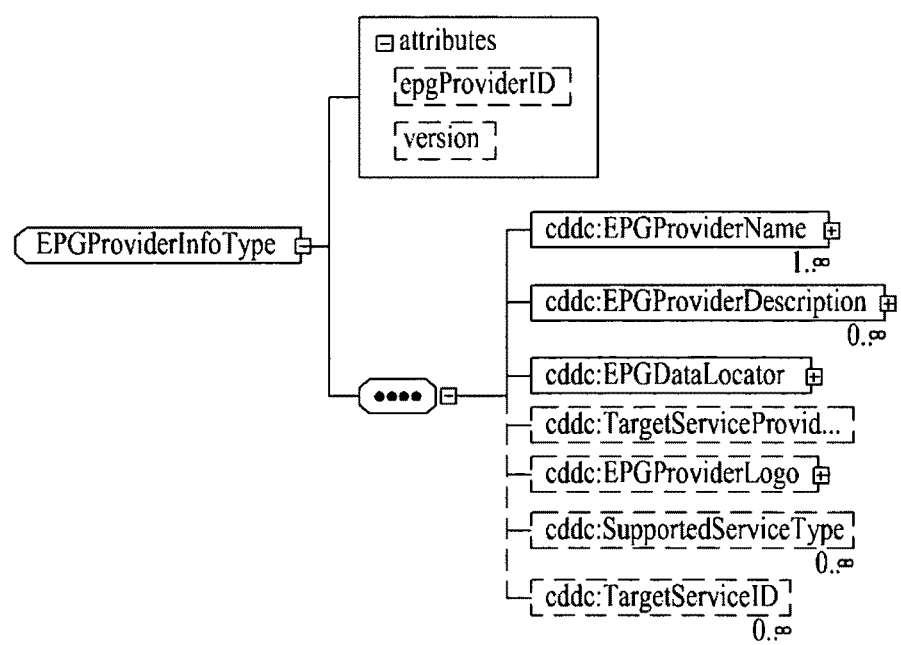

FIGS. 34 and 35 are diagrams showing a data structure of EPG provider information according to another embodiment of the present invention.

Figure 36:
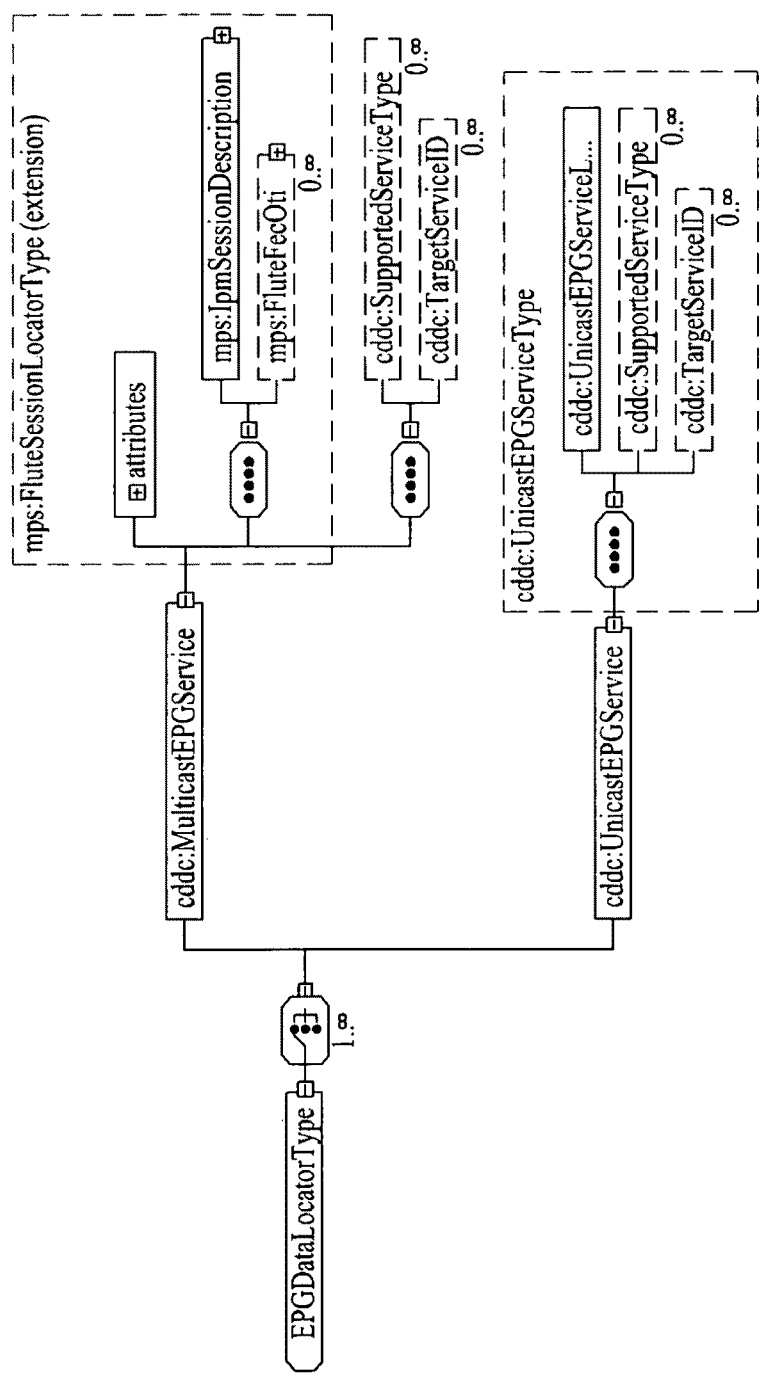

FIGS. 36 and 37 are diagrams showing a data structure of an EPG data locator according to another embodiment of the present invention.

The following methods may be used together or independently in the method of providing the COD catalog server address using EPGProviderInfo. This is a method of including a target service list of the EPG metadata provided by the EPG provider. As shown in FIGS. 34 and 35, the target service list is directly arranged in the form of "TargetServiceID". Therefore, if the metadata for specific services with access rights to service metadata or to which the user subscribes is desired to be selectively received, the target service list may be used as a criterion for selecting the EPG provider.

In addition, this may be specified according to the EPG Data Locations provided by the EPG provider. The schema of this case is shown in FIGS. 36 and 37. Both the MulticastEPGService and UnicastEPGService are extended to have 0 or more "SupportServiceType" and "TargetServiceID" as low-level elements. Through these elements, the service type and the service ID supported according to the EPG data Locations may be specified and, based on this information, the EPG DATA Location to be received may be selected.

Figure 38:
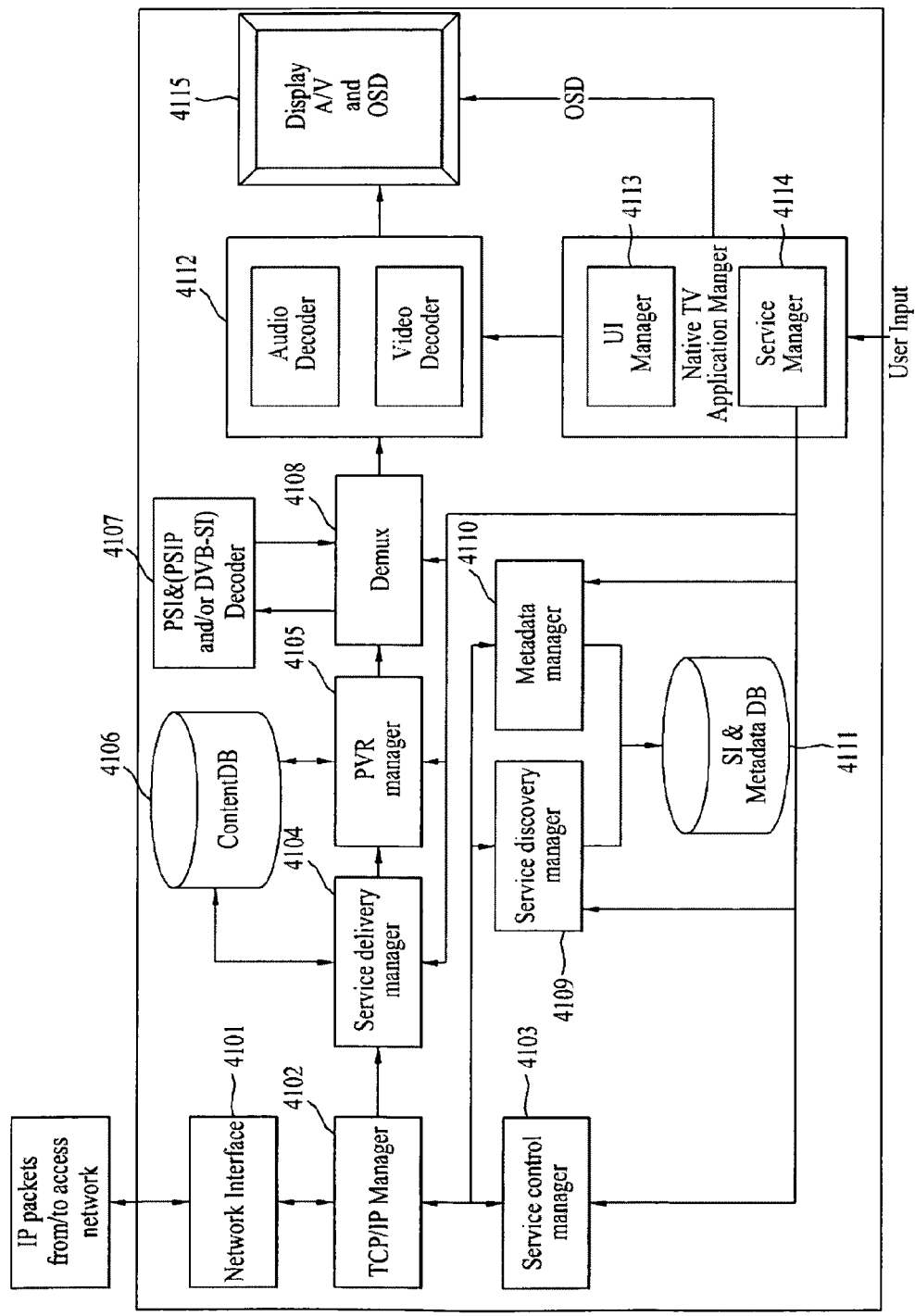
FIG. 38 is a diagram showing a network device according to an embodiment of the present invention.

FIG. 38 is a diagram showing a network device according to an embodiment of the present invention.

A Network Interface 4101 performs reception/transmission of IPTV packets. The network interface 4101 may correspond to physical & data link layers.

A TCP/IP Manager 4102 is responsible for end-to-end (source to destination) packet delivery. The TCP/IP manager 4102 classifies each packet into an appropriate protocol manager.

A Service Delivery Manager 4104 is responsible for handling real-time streaming data and downloading content. The service delivery manager 4104 is also responsible for retrieving content from the Content DB for later consumption. RTP/RTCP (Real-Time Transport Protocol/RTP Control Protocol) may be used with MPEG-2 TS. MPEG-2 packets are encapsulated in RTP. The service delivery manager 4104 parses RTP packets and sends the parsed transport packets to a DEMUX. The service delivery manager 4104 sends feedback regarding network reception quality using RTCP. MPEG-2 transport packets may be carried directly in UDP without RTP. For content downloading, HTTP or FLUTE protocol may be used as the delivery protocol.

A demultiplexer 4108 performs de-multiplexing of audio, video and PSI tables from input transport packets. The demux 4108 controls the de-multiplexing for PSI tables by the PSI Decoder. The demux 4108 forms the sections of the PSI tables and sends them to the PSI Decoder. The demux 4108 controls de-multiplexing of A/V transport packets.

A PSI & (PSIP and/or DVB-SI) Decoder 4107 may correspond to a PSI (and PSIP/DVB-SI) Control Module. The PSI & (PSIP and/or DVB-SI) Decoder 4107 sets PIDs for PSI tables and PSIP/DVB-SI tables to DEMUX. The PSI & (PSIP and/or DVB-SI) Decoder 4107 decodes the private sections of PSI and (PSIP and/or DVB-SI) sent by the DEMUX. The decoding result is used to de-multiplex input transport packets. (e.g., set Audio and Video PID to DEMUX.)

An Audio and Video Decoder 4112 decodes audio and video elementary stream packets.

An A/V and OSD Displayer 4115 receives audio and video data from the A/V Decoder. The A/V and OSD Displayer 4115 controls video and audio data and displays the video data on a screen and outputs the audio data through speakers. The A/V and OSD Displayer 4115 controls OSD (On Screen Display) Graphic data.

A Native Application manager and UI (User Interface) Manager 4113 operates the Graphical User Interface on the TV Screen, receives user keys input via remote control or front panel, and manages the states of the whole TV system.

A Service Manager 4114 controls all the other managers related to the services like Service control manager, Service delivery manager, IG-OITF client, Service Discovery manager, and Metadata manager. The service manager 4114 is responsible for serving IPTV services.

An SI & Metadata DB 4111 is a database for Service Discovery information and Metadata related to the services.

An SD (Service Discovery) Manager 4109 enables discovery of IPTV services over a bi-directional IP network. The SD manager 4109 provides all the information for selecting services.

A Service Control Manager 4103 is responsible for selecting and controlling services and managing sessions. The service control manager 4103 selects live broadcasting services, using IGMP or RTSP protocol. The service control manager 4103 selects VOD content, using RTSP protocol. If using IMS, SIP protocol is used to initiate and manage sessions through the IMS Gateway. RTSP protocol can be used to control the delivery of broadcast TV and audio as well as for on-demand delivery. RTSP protocol uses a persistent TCP connection and allows trick mode control during real-time media streaming.

A Content DB 4106 is a database for content which may be delivered via a content download system or may be recorded from live media TV.

A PVR manager 4105 is responsible for recording and playing live streaming content. The PVR manager 4105 gathers all the necessary metadata of the recorded content and generates additional information to improve the user experience (e.g. thumbnail image, index etc). Furthermore, a metadata menager 4110 controls metadata on EPG.

Figure 39:
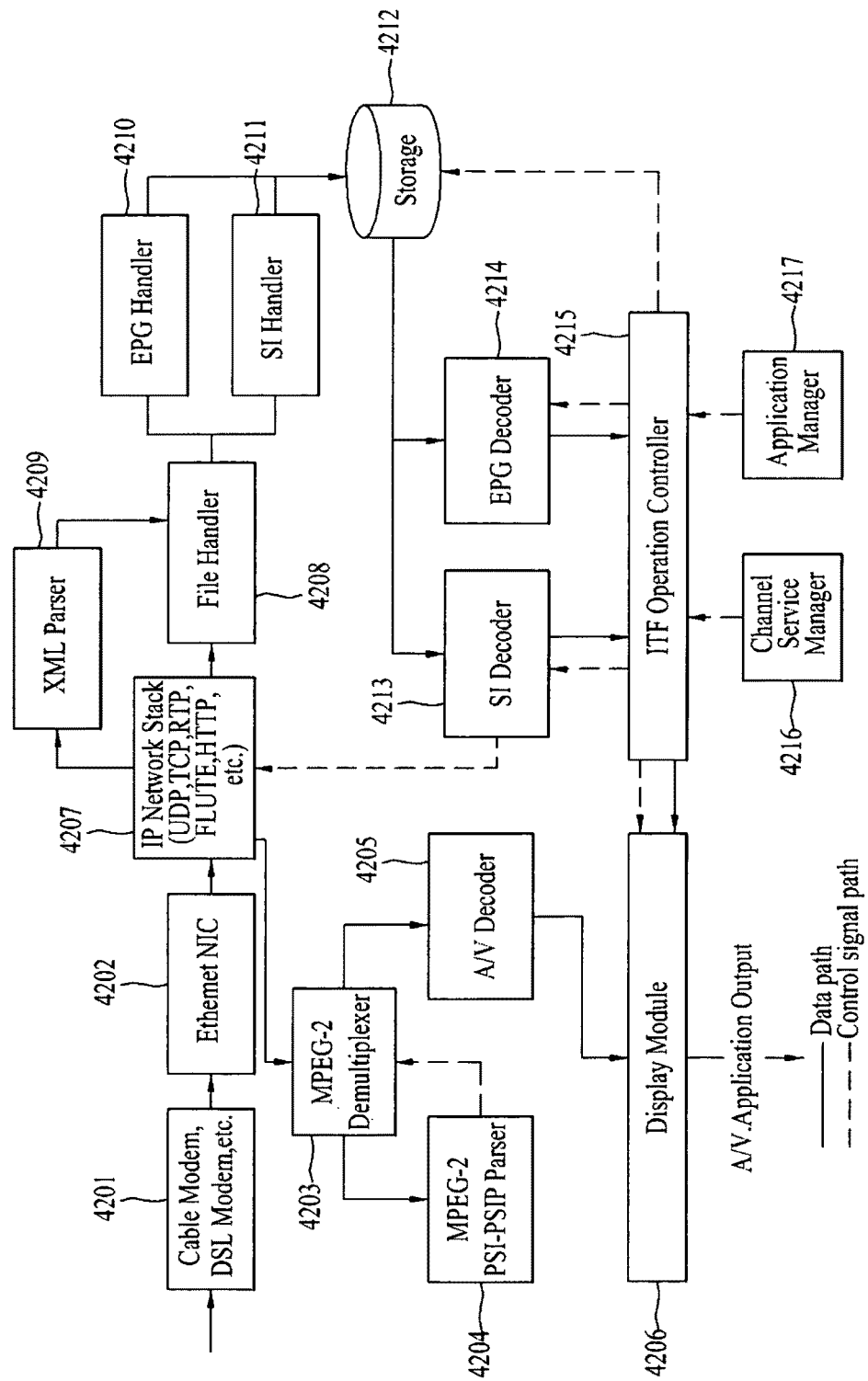
FIG. 39 is a diagram showing a network device according to another embodiment of the present invention.

FIG. 39 is a diagram showing a network device according to another embodiment of the present invention.

FIG. 39 is a functional block diagram of modules of the network (e.g., an IPTV Terminal Function (ITF)). In FIG. 39, an arrow denoted by a solid line denotes a data path and an arrow denoted by a dotted line denotes a control signal path.

A modem module 4201 including a cable modem, a DSL modem, etc. is an interface for connecting the ITF to an IP network at a physical level, which demodulates a signal transmitted through a physical medium and restores a digital signal.

An Ethernet NIC 4202 restores the signal received through the physical interface to IP data.

An IP Network Stack 4207 handles each layer according to the IP protocol stack.

An XML parser 4209 parses an XML document of the received IP data.

A File Handler 4208 handles data, which is transmitted in the form of a file, of the received IP data using FLUTE or the like.

An SI Handler 4211 handles a portion corresponding to IPTV SI data of the received data in the form of the file and stores it in a storage.

An EPG Handler 4210 handles a portion corresponding to IPTV EPG data of the received data in the form of the file and stores it in the storage.

A Storage 4212 stores data such as SI or EPG.

An SI Decoder 4213 retrieves SI data from the storage, analyzes the SI data, and restores necessary information, if channel map information is necessary.

An EPG Decoder 4214 retrieves EPG data from the storage, analyzes the EPG data, and restores necessary information, if EPG information is necessary.

An ITF Operation Controller 4215 is a main controller for controlling the operation of the ITF, such as channel change or EPG display.

A Channel Service Manager 4216 receives an input from the user and manages operations such as channel change.

An Application Manager 4217 receives an input from the user and manages an Application service such as EPG display.

An MPEG-2 Demultiplexer 4203 extracts an MPEG-2 Transport Stream from the received IP datagram and delivers it to a corresponding module according to PIDs.

An MPEG-2 PSI/PSIP Parser 4204 extracts and parses PSI/PSIP data including information providing access to a program element, such as PID information of each (A/V, etc.) of the MPEG-2 Transport Stream in the received IP datagram.

An A/V Decoder 4205 decodes the received audio and video data and delivers the decoded data to a display module 4206.

Further, the content metadata delivery mechanism according to an embodiment of the present invention has a content metadata delivery method using two layers as follows.

First, a base-layer metadata delivery channel is used, which is a channel for delivering metadata composed of minimum information necessary for selecting content.

The existing metadata has sufficient flexibility to deliver metadata information for all items to be considered. If such flexibility is allowed and the number of pieces of content is significantly large, the size of the metadata information for the entire list may be increased to a degree at which the terminal cannot receive and process the metadata information. For fast content browsing, such flexibility is partially applied, and only requisite minimum metadata is defined and rapidly delivered to the terminal so as to perform browsing.

A stream (channel) which minimizes the amount of information to a degree at which the metadata information of all content can be rapidly delivered to the terminal and delivers the information even when the number of pieces of content is significantly large is defined as a base-layer metadata delivery channel. This method advantageously allows the minimized metadata information to be processed even in a terminal which cannot process a large amount of metadata, such as a terminal with a restricted storage space or a restricted function.

Since the size of the base layer is minimized, the terminal receives, stores and uses the metadata information through a multicast stream, etc. The metadata may be delivered using another method such as a unicast (HTTP, HTTP/SOAP Query) method.

Further, a second-layer metadata delivery channel is used, which is a channel for delivering additional metadata other than the metadata delivered by the base layer.

Since the base layer includes only the basic metadata items, additional metadata may be necessary to facilitate user selection of content. The channel for delivering the additional metadata delivers the metadata through a separate second-layer metadata delivery channel.

The second-layer metadata may be delivered using the following methods.

First, an HTTP or SOAP Query scheme is used. By requesting the additional metadata for the content selected through the base-layer metadata from the server using the HTTP or SOAP Query scheme, the additional metadata can be received.

Second, a unicast scheme is used. By requesting the overall second-layer metadata from the server, the second-layer metadata is received using the unicast scheme, and local browsing/search/naviation is performed.

Third, a multicast scheme is used. If the overall second-layer metadata is transmitted using the multicast scheme, the terminal receives the metadata by joining to the multicast stream and performs local browsing/search/navigation.

If the metadata is provided using separate channels, the service provider provides the metadata with various flexibilities and efficiencies as follows.

First, the metadata corresponding to the base layer may be delivered to and stored in the terminal so as to enable local browsing. When local browsing is performed in a state in which the content metadata is stored in the terminal, it is possible to reduce server load and network usage, as compared with the case where the metadata is stored in the server, and, whenever the metadata is necessary, the terminal requests the metadata from the server and receives and processes the metadata. Since the speed at which the user request is processed is increased, fast service provision is possible.

Even when the metadata is stored in the server and the terminal interactively requests the metadata, the base-layer metadata may be used.

In the present invention, an efficient query mechanism available in various layers is provided.

Figure 40:
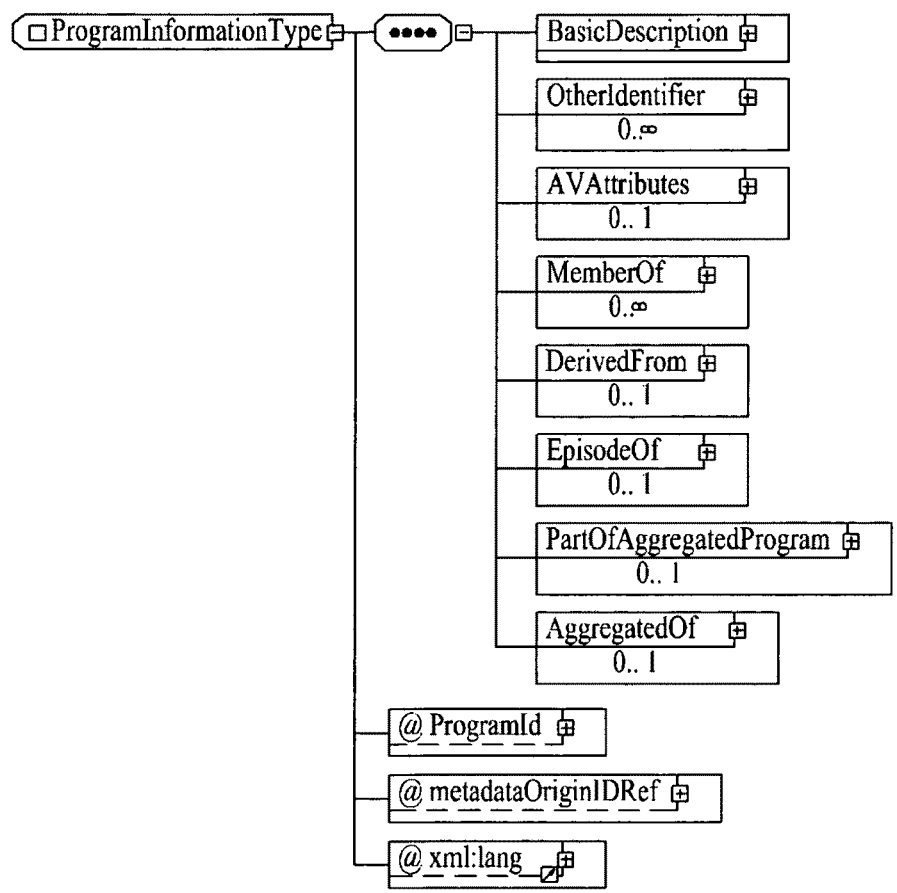

FIGS. 40 and 41 are diagrams showing an example of program information according to an embodiment of the present invention.

Figure 42:
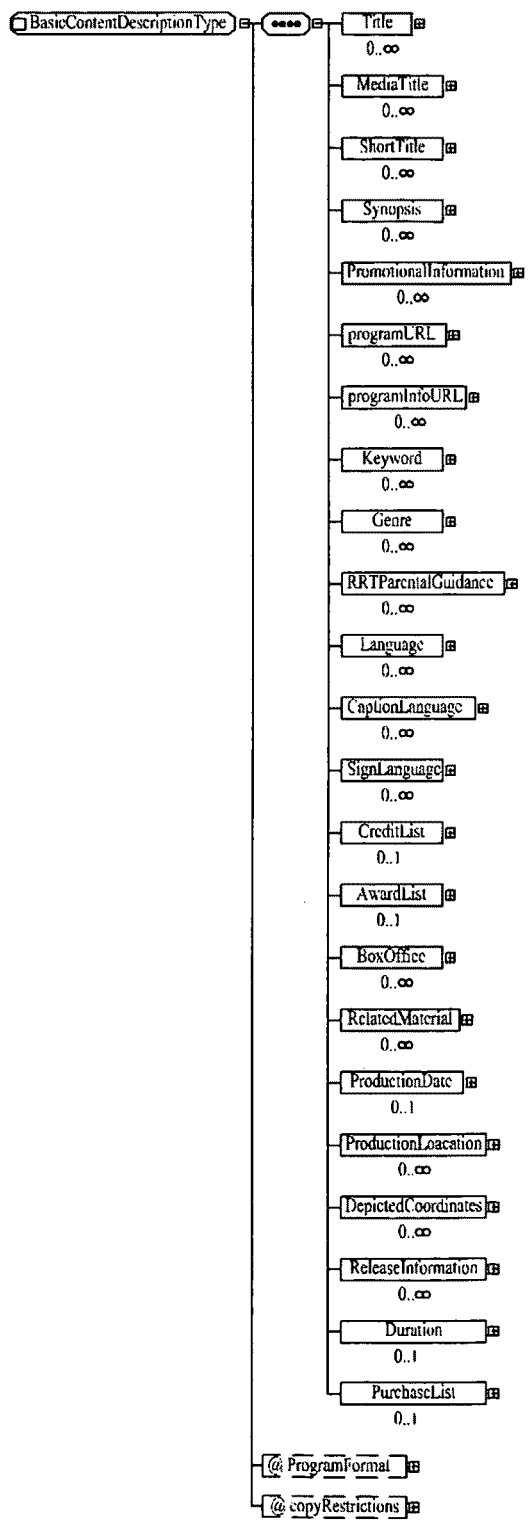

FIGS. 42 and 43 are diagrams showing an example of basic description according to an embodiment of the present invention.

Since the currently defined metadata format is too vast, it is difficult to efficiently provide a large amount of data for COD content. Even in a terminal having a restricted function, it is difficult to support the standard of a large amount of metadata.

In order to solve such a problem, in the present invention, metadata is configured and delivered using a third layer (or an n-layer (n being greater than 3)). In this case, by changing the level of detail of the metadata stepwise, different amounts of metadata can be provided although information about the same amount of content is provided. With respect to a small amount of metadata, brief information about a large amount of content is rapidly provided using list reception, inquiry, etc. and, when the user wants to view the detailed information, a large amount of information about a small amount of content is provided.

In order to provide information with different levels of detail, the following information configuration using three steps may be considered.

First, list information is provided. Only minimum information regarding each piece of content is provided for the purpose of list provision such that information about a large amount of content is efficiently transmitted.

Second, lightweight EPG information is provided. The configuration of the information is minimized such that terminals with restricted screen size, storage space and CPU processing capability, such as a mobile phone, can sufficiently process the information, but the information is configured to be suitably used for selecting the content. The amount of this information is greater than that of the list information, but is less than that of full EPG information.

Third, full EPG information is provided. This information includes the most detailed information including all types of metadata.

In the step of providing the full EPG information, all metadata elements defined in the EPG metadata can be used without restriction. In the remaining two steps, the information may be configured according to the following restriction.

The XML schema of an element including program (content) information is shown in FIGS. 40 and 41.

At this time, content metadata for the list information may be used with a restriction that only the following attributes and low-level elements are used.

ProgramID is an identifier for uniquely identifying a program (content) described by program information.

BasicDescription is included, but is restricted to include only the following description portion.

FIGS. 42 and 43 show the XML schema of BasicDescription Type. BasicContentDescriptionType provides basic information regarding a program (content) or a group composed of a set of programs and a super group composed of a set of groups.

The metadata for the list information may include the following fields. Such a restriction is applicable to the program, the group and the super group.

ShortTitle indicates the title of the program, in which a maximum of 80 English letters is supported.

Genre indicates the genre of the program.

RRTParentalGuidance indicates a rating value according to a parental guidance system.

Language is a description of supported spoken languages.

CaptionLanguage is a description of supported caption languages.

If the list information is minimized, the above restriction may be used. With respect to definition of metadata items having details of the list step, fewer or more embodiments may be possible.

Hereinafter, the other embodiments will be described.

The content metadata having the details of the lightweight EPG may be used with a restriction that only the following attributes and low-level elements are used.

ProgramID is an identifier for uniquely identifying a program (content) described by program information.

AVAttribute may include a low-level element and describes media attribute information of the audio/video of the program (e.g., codec, size, etc.)

BasicDescription is included, but is restricted to include only the following description portion.

Metadata having the details of the lightweight EPG information may include the following matters.

ShortTitle indicates the title of the program, in which a maximum of 80 English letters is supported.

ProgramInfoURL is a URL capable of acquiring additional program information.

Genre indicates the genre of the program.

RRTParentalGuidance indicates a rating value according to a parental guidance system.

Language is a description of supported spoken languages.

CaptionLanguage is a description of supported caption languages.

SignLanguage is a description of supported sign languages.

The synopsis is a textual description. In the lightweight EPG, a length attribute value is restricted to "short" so as to be restricted to a maximum of 90 English letters. This length is only exemplary and other values may be used.

CreditList indicates information about credited persons of the program and includes a maximum of five roles (main roles, production, scenario, etc.) and a maximum of three names per role. Since the lightweight EPG may not provide a separate table for persons in consideration of size, it is preferable that only the names of persons necessary for explaining a work are directly described.

If the information is configured using the three steps, all the delivery layers may be configured using three steps so as to respectively deliver information, configurations, or two-step information configuration may be selected and delivered using two steps. The above 2-layer configuration is divided into the lightweight EPG and the full EPG.

Figure 44:
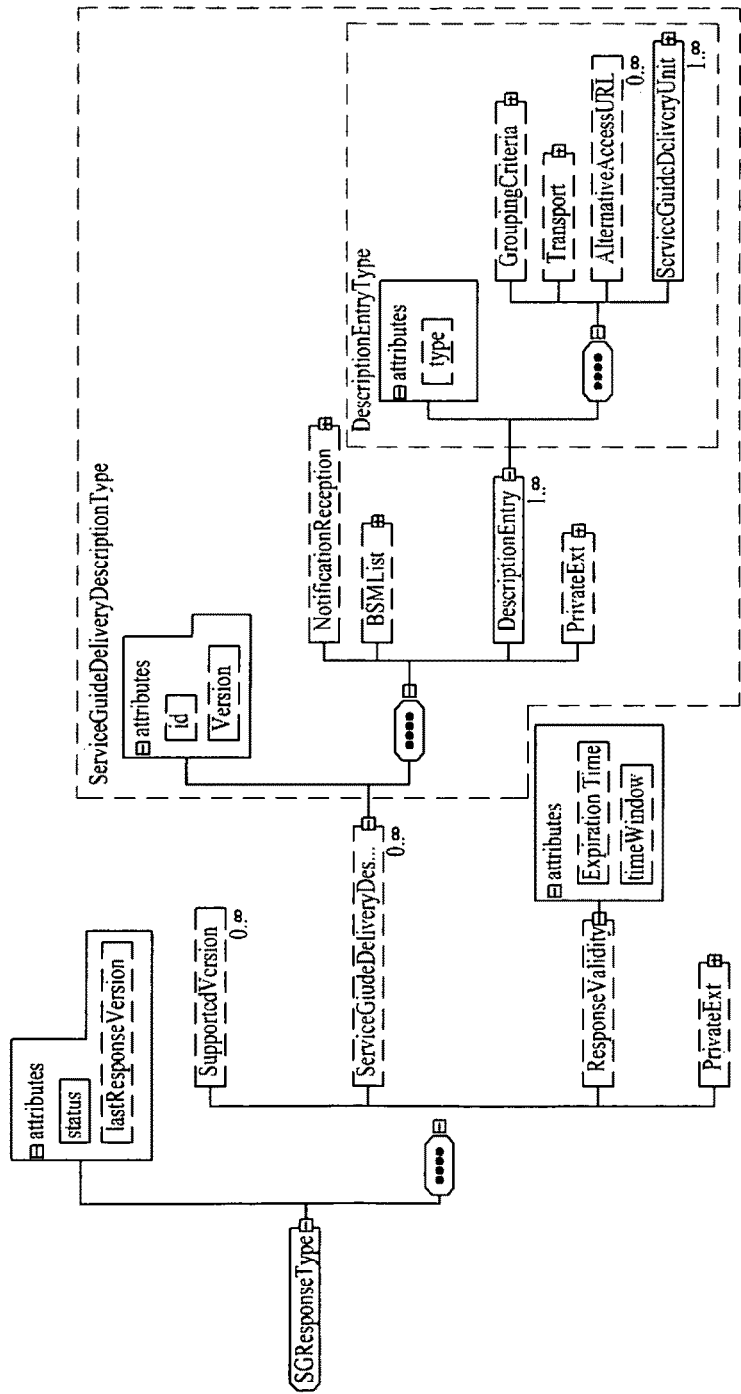
FIG. 44 is a diagram showing a data structure of an SG response according to an embodiment of the present invention.

FIG. 44 is a diagram showing a data structure of an SG response according to an embodiment of the present invention.

Query may be performed using various schemes such as HTTP or SOAP. In the present invention, query is performed based on HTTP. The method of making query efficient, which is proposed by the present invention, is not limited to this transfer protocol and other protocols such as SOAP may be used.

The query request may be used, for example, through the "POST" method of HTTP/1.1.

At this time, parameters included in the query request are composed of a key-value pair and are delivered according to the convention in which HTML form data is used through the "POST" method. The parameters are delivered to the server in a state of being included in a "message-body" area of an HTTP/1.1 "Request" message.

One query request may include a plurality of key-value pairs. At this time, the key-value pairs are distinguished by "&".

A response from the server to the query request includes an "SGResponse" element having the schema shown in FIG. 44, and EPG metadata fragments encapsulated in a service guide delivery unit may be included immediately after the "SGResponse" element.

If the retrieval result of a specific item of the EPG metadata is requested, the query may be configured under the following conditions.

The 'message-body' of the HTTP/1.1 request message must contain key-value pairs, using <key> as the key representing the criteria and <value> as the value from the domain of the criteria. These key-value pairs are delimited by '&'. If several key-value pairs are given, they are combined as follows:

If there are several key-value pairs having the key "serviceType", these are combined using AND logic, i.e. the expected reply are Service Guide fragments that satisfy all given criteria.

If there are several key-value pairs having the key "genre", these are combined using AND logic, i.e. the expected reply are Service Guide fragments that satisfy all given criteria.

Otherwise, key-value pairs having the same key are combined using OR logic, i.e. the expected reply are Service Guide fragments that satisfy at least one of the given criteria. The group of OR-combined keys is treated as one entity in the next step below.

Key-value pairs (or groups of pairs having the same key) having different keys are combined using AND logic, i.e. the expected reply are Service Guide fragments that satisfy all given criteria.

The response to a terminal request containing key-value pairs specifying the set of fragments the terminal expects to receive contains all the fragments matching the given criteria and includes, in addition, fragments that do not match the given criteria. If the terminal request does not contain any key-value pairs having the keys "validFrom" or "validTo", then the response contains only fragments that are currently valid.

The method of evaluating the matching of the key-value pairs is exemplary and is not limited thereto, and other evaluation methods may be used.

FIG. 45 is a diagram showing fragment values according to an embodiment of the present invention.

Query may support the following key-value pairs.

A retrieval parameter may be largely divided into key-value pairs corresponding to search criteria and additional parameters capable of further narrowing the retrieval result.

The EPG metadata fragments obtained by such retrieval result should have integrity. If any fragment of the result refers to another fragment, the referred fragment should be included.

First, the following items can be supported as search criteria.

<key>: "title"
<value>: title of Program, Group, SuperGroup or text of ShortTitle element
Meaning: All Program, Group and SuperGroup, in which <value> is included in title of BasicDescription or the text of ShortTitle element of Program, Group and SuperGroup, are requested.

The following method may be used as another method of using "title"<key>.

<key>: "title"
<value>: Element "Title" or "ShortTitle" used within ProgramInformation.BasicDescription fragments
Meaning: ITF requests ProgramInformation fragments having element "Title" equal to or containing <value>, and also other Service Guide fragments associated with these ProgramInformation fragments.

In this case, the Title is used to determine the title of the program.

<key>: "keyword"
<value>: value of keyword element in BasicDescription of Program, Group and SuperGroup
Meaning: All Program, Group and SuperGroup, in which the value of the keyword element on BasicDescription of Program, Group and SuperGroup is equal to <value>, are requested.

<key>: "genre"
<value>: Value of genre element in BasicDescription of Program, Group and SuperGroup
Meaning: All Program, Group and SuperGroup, in which the value of the genre element on BasicDescription of Program, Group and SuperGroup is equal to <value>, are requested.

<key>: "credit"
<value>: [<role>":"]<creditName> is used, <role> indicates the role such as director, scenario or actor, ":" is a separator and a person's name appears. <role> may be omitted and only the person's name may be indicated. At this time, it is indicated that the person participates in the program regardless of the role. This corresponds to CreditsList element information including the role and the name of the person who participates in each program.
Meaning: If <role> is specified, a program, in which the name <creditName> of the person who participates in the program matches the role, is requested, and, if <role> is not specified, a program in which the person specified by <creditName> participates in the program regardless of the role is requested.

ITF requests ProgramInformation fragments having element "CreditsItem" contains <creditname> exactly or partially matching one of GivenName element, LinkingName element, and FamilyName element of PersonName element or to one of Name element and NameTerm element of OrganizationName element, and also Service Guide fragments associated with these ProgramInformation fragments.

<key>: "fragmentType"
<value>: One of "fragmentType" values shown in FIG. 45 may be used.
Meaning: Terminal requests Service Guide fragments that are of type <value>.

<key>: "programId"
<value>: Attribute "programId" used within ProgramInformation fragments
Meaning: ITF requests ProgramInformation fragments having attribute "programId" equal to <value>, and also other Service Guide fragments associated with these ProgramInformation fragments.

The following effects can be obtained by restricting the above search criteria in this manner.

First, index configuration of a metadata server of the server side is facilitated and thus fast retrieval is possible. Instead of retrieval of all metadata items, by restricting retrieval such that items which can be used by the user can be retrieved, index configuration is facilitated and thus retrieval results can be more rapidly obtained.

Further, the IPTV service should provide an available service even when only a remote controller is used in a state in which the user is located 2 to 3 m from the display, unlike a PC. Accordingly, unlike when using a PC, text input is not facilitated. In addition, the increase in the number of retrieval items may not necessarily facilitate the user's actual use of the service.

Figure 46:
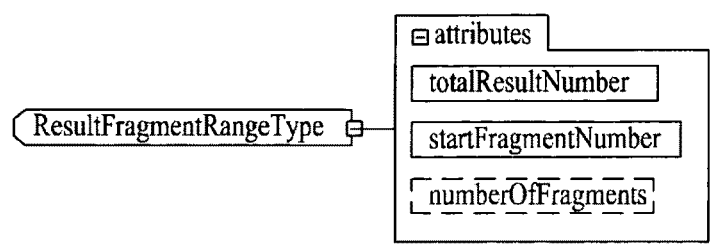

FIGS. 46 and 47 are diagrams showing a data structure of a result fragments range according to an embodiment of the present invention.

In order to narrow the retrieval result of the query in greater detail, the following parameter key-value pairs may be used.

In the present invention, the following three methods are proposed.

First, level of metadata information (level of detail) is designed to be set.

This is a parameter for setting the amount of information included in the metadata delivered as the query result. In the present invention, the above-defined configuration of the EPG metadata using three steps may be used herein.

<key>: "levelOfDetail"
<value>: One of "list", "lightweight" and "full"

The meaning of each of the key values is as follows.

1) "list": This is the above-defined list metadata configuration and is used when only minimum information of each content is provided for the purpose of list provision such that brief list information of a large amount of content is requested.

2) "lightweight": The configuration of the information is minimized such that terminals with restricted screen size, storage space and CPU processing capability, such as a mobile phone, can sufficiently process the information, but the information is configured to be suitably used for selecting the content. The amount of this information is greater than that of list information, but is less than that of full EPG information.

3) "full EPG": This information includes most detailed information including all types of metadata.

This is one embodiment and the metadata may be configured in more detail or in less detail. The <value> may be suitably used according to the above configurations.

Second, a retrieval range is designed to be specified.

The EPG provider may provide information about one or more IPTV service providers, and each IPTV SP may provide one or more services. In addition, a query may be used to perform retrieval with respect to a specific SP or, in more detail, a specific service.

Parameters for retrieval may be configured as follows.

<key>: "targetserviceProviderID"
<value>: <SP_ID>[";"<SP_ID>] <SP_ID> is a service provider ID to be retrieved and may specify one or more SPs. If an "all" value is provided or this key-value pair is omitted, all service providers may be retrieved. If a plurality of SP IDs is provided as one key-value pair, all the SPs are handled under an "or" condition and become objects to be retrieved.

<key>: "targetServiceID"
<value>: <Service_ID>[";"<Service_ID>] <Service_ID> is a service ID to be retrieved. If an "all" value is provided or this value is omitted, all services may be retrieved. If a plurality of service IDs is provided as one key-value pair, all the service becomes objects to be retrieved.

If the key-value pair is provided, the retrieval range is restricted to content belonging to the SP or the service corresponding thereto.

As in the above example, a plurality of SP IDs or service IDs may be specified by one key-value pair or one SP ID or service ID may be specified by one key-value pair. At this time, a plurality of key-value pairs may be present. All the key-value pairs are processed under an "or" condition, and become objects to be retrieved.

Third, the number of retrieval results to be simultaneously received is specified.

If the number of retrieval results is large, all the retrieval results are not received once, and instead only a predetermined number of results displayable on the screen of the terminal is received once and is displayed to the user. Thereafter, the user may additionally request the other retrieval results or request or purchase detailed information regarding the content within these results.

This is a method of specifying the number of fragments to be included in one response when the response is returned in response to a query.

The following key-value pair is included in a query request so as to specify a total number of results.

<key>" "numberOfResultFragments"
<value>: Total number of fragments to be included in the returned response.

Meaning: Only fragments of the number specified by the <value> are returned.

If only one fragmentType is specified upon query request, the results having the specified fragmentType may be returned by the above number as a maximum. If two or more fragmentTypes are specified or the fragmentType is not specified, the total number of fragments is restricted to the above value, and a determination as to how many/which fragmentTypes are returned may be made according to a retrieval logic of the server for providing the retrieval results.

If the total number of retrieval results is greater than the number of returned results, the next results may be additionally received.

Therefore, the range of the returned results should be specified upon query. The following key-value pair may be used.

<key>: "startResultFragment"
<value>: Start number of result fragments to be received Meaning: Retrieval result fragments are numbered by a method according to a retrieval logic used by an SP. Various rankings according to accuracy or most recent publication may be present. The start number of the results to be received is specified by such a number. For example, if "21" is specified, the "numberOfResultFragments" number of results is requested from the $21^{st}$ result of an upper level after retrieval.

Instead of the method of specifying the start number of the fragment to be received, if one response is treated as one page displayed to the user, a method of specifying the page number may be used.

<key>: "pageNumber"
<value> Number of page of the results to be received

Meaning: In this case, the "numberOfResultFragments" key-value pair should be necessarily included, and two values are multiplied so as to specify an accurate range of the results.

For the method of restricting the number of retrieval results, the total result number of the query and the section of the results included in the current response need to be accurately included in an SGResponse included in each response.

Therefore, the elements of ResultFragmentsRangeType shown in FIGS. 46 and 47 are added to the PrivateExt of the SGResponseType shown in FIG. 44.

Figure 48:
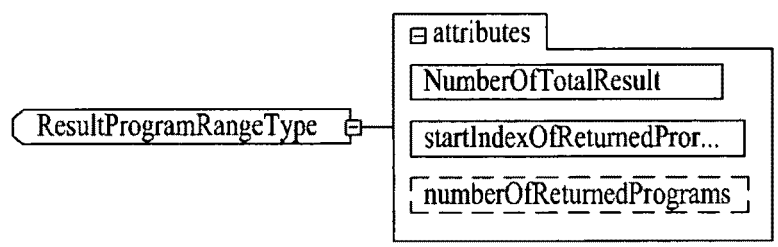

The attributes of ResultFragmentsRangeType have the following meaning.

totalResultNumber: Total number of retrieval result fragments of the query startFragmentNumber: Number of all retrieval results included in this response and the number of a first fragment of the result range numberOfFragments: Total number of fragments included in this response FIGS. 48, 49 and 50 are diagrams showing a data structure of a result programs range according to an embodiment of the present invention.

As another embodiment of the method of specifying the number of retrieval results to be received once, the following method may be considered.

A method of specifying the number of programs to be included in one response when the response is returned in response to a query may be used.

When the user performs a query, an object to be retrieved is generally content, and the fragment occupying a largest portion of the EPG metadata fragments is a programInformation fragment describing information about the content. Therefore, when the number of programs is restricted in the retrieval result, most adequate intuitive results are returned to the user.

The following key-value pair may be included in the query request so as to specify the total number of results.
<key>: "numberOfReturnedPrograms"
<value>: unsigned integer
Meaning: <value> specify how many results to return in this response.

If the total of retrieval results is greater than the number of returned results, the next results may be additionally received.

Therefore, the range of the returned results should be specified upon query. The following key-value pair may be used.
<key>: "startIndexOfReturnedPrograms"
<value>: unsigned integer
Meaning: <value> specifies which one is the first program contained in this response. Retrieval result programs are numbered by a method according to a retrieval logic used by an SP. Various rankings according to accuracy or most recent publication may be present. The start number of the results to be received is specified by such a number. For example, if "21" is specified, the "numberOfResultFragments" number of results is requested from the $21^{st}$ result of an upper level after retrieval.

The method of specifying the page number may also be used even in this embodiment.

For the method of restricting the number of retrieval results, the total result number of the query and the section of the results included in the current response need to be accurately included in an SGResponse included in each response. Therefore, the elements of ResultProgramsRangeType shown in FIGS. 48 and 49 are added to the PrivateExt of the SGResponseType shown in FIG. 44.

The attributes of ResultProgramsRangeType have the following meaning.

numberOfTotalResult: Total number of retrieval result programs of the query startIndexOfReturnedProgram: Number of all retrieval results included in this response and the number of a first fragment of the result range numberOfReturnedPrograms: When present, the numberOfReturnedPrograms attribute shall give a count of the number of programs in the response to a query. If not present, this equals what is specified by "numberOfReturnedPrograms" <key> in the query request.

If such a range is specified and the partial results are continuously received, the EPG metadata server performs retrieval according to this request again, does not send the result, stores the result using a caching method upon initial request, applies a specific identifier, and returns the query result during a predetermined period from the stored result.

ResultProgramsRangeType is extended as shown in FIG. 50 and is used by applying a unique identifier to the query result. queryReferenceId is added as an attribute, a unique identifier is applied to the query by the EPG metadata server, an additional query is performed based on the unique identifier, and the residual partial result is received.

queryReferenceID: Unique identifier applied to the query, the range of which is specified, by the EPG metadata server If queryReferenceID applied by the server is present, a query for requesting another range of the same query may be performed using the following query key.
<key>: "queryReferenceID"
<value>: IIFIDType value and unique identifier applied to the query by the EPG metadata server
Meaning: Some or all of the query results identified by <value> are requested.

By only specifying the key and the range of the results to be obtained, the result corresponding to another range of the query performed in advance can be obtained.

Figure 51:
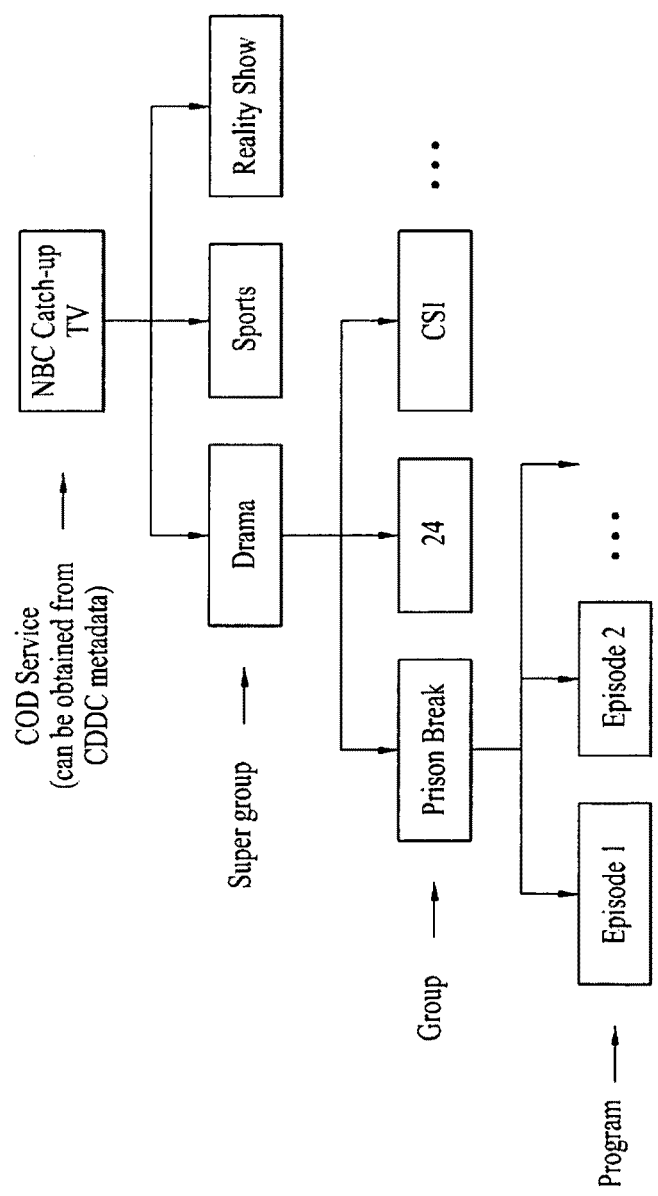
FIG. 51 is a diagram showing hierarchy of COD services according to an embodiment of the present invention.

FIG. 51 is a diagram showing the hierarchy of COD services according to an embodiment of the present invention.

FIG. 52 is a diagram showing a data structure of a super group according to an embodiment of the present invention.

The SuperGroup according to one embodiment of the present invention may have only a group as a child and the group may have only a program as a child. That is, only SuperGroup-Group-Program step is allowed. At this time, if the above-described hierarchical structure is applied to the COD, the structure shown in FIG. 51 is obtained. In order to acquire information about the SuperGroup of a first step from an actual COD service, the query is performed as follows.

tagetServiceID=<Target COD Service ID>: ID of the COD service to perform hierarchical navigation
fragmentType=0x87: restricted to (supergroup)
leveOfDetail=list: if only a list is required, it may be specified and another value may be specified so as to receive more detailed information.

Additionally, the retrieval result number or the retrieval result range may be restricted.

In this configuration, the SuperGroup of the COD service may be used as such a hierarchical structure (SuperGroupType of SuperGroup uses only "otherChoice").

In order to allow another type of SuperGroup, a new SuperGroupType may be added. As a type indicating the hierarchical structure of the COD service, a new SuperGroupType "hierarchyofService" may be added and used and this is shown in FIG. 52.

In this case, parameters according to SuperGroupType should be requested as follows.
<key>: "SuperGroupType"
<value>: one of SuperGroupType values shown in FIG. 52
Meaning: SuperGroup in which SuperGroupType is equal to <value> is returned.

An example of adding the above parameter to the query is as follows.
SuperGroupType="hierarchyOfService": Only SuperGroup configuring the service in the hierarchical structure is requested.

In this case, even when fragmentType is not specified, only SuperGroup may be returned and processed.

Figure 53:
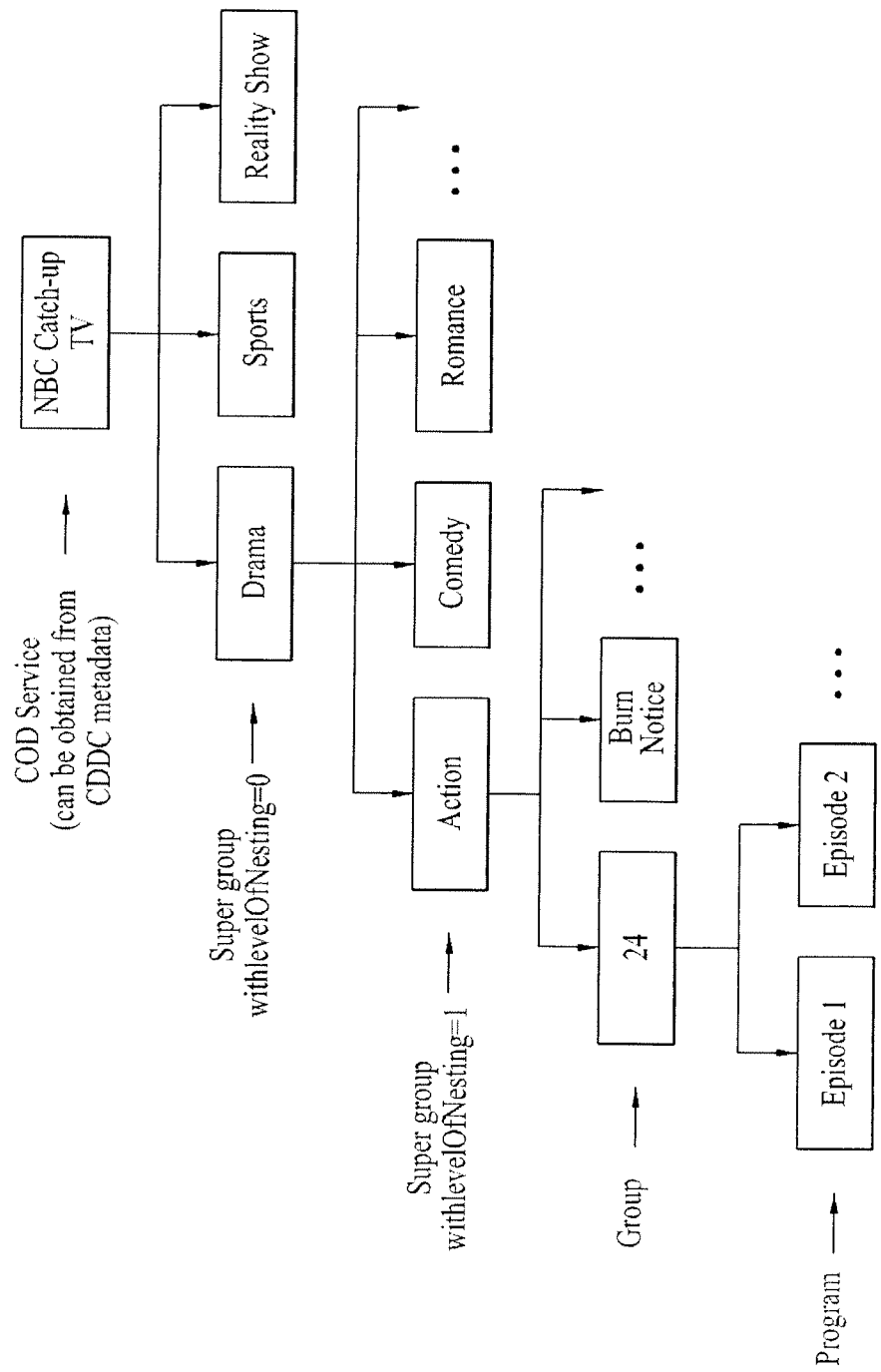
FIG. 53 is a diagram showing hierarchy of COD services according to another embodiment of the present invention.

FIG. 53 is a diagram showing hierarchy of COD services according to another embodiment of the present invention.

Figure 54:
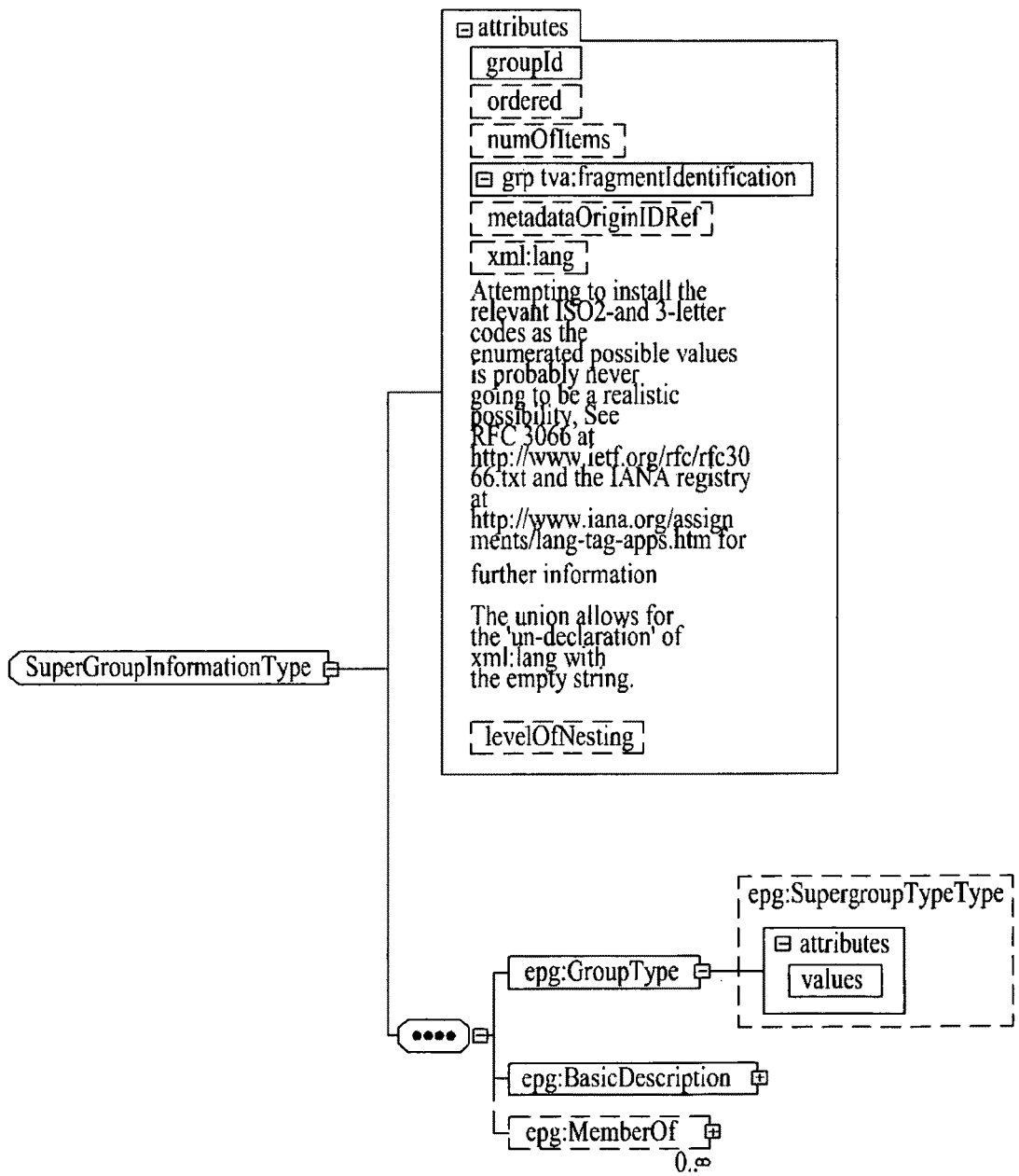

FIGS. 54 and 55 are diagrams showing a data structure of super group information according to an embodiment of the present invention.

In consideration of the fact that the amount of COD content is significantly large, restriction of the configuration of the hierarchical structure using only three steps may cause a problem. In order to solve the problem, the SuperGroup is extended such that, for example, a maximum of three steps is included in another SuperGroup so as to provide a 5-step hierarchical structure.

The schema of the extended SuperGroupInformationType is shown in FIGS. 54 and 55.

A memberOf element is added as a low-level element so as to belong to any other SuperGroup as a member. A levelOfNesting attribute is added, has a basic value of 0, indicates to which step of SuperGroup it belongs, and is set to a value obtained by adding 1 to a largest value of levelOfNesting values of SuperGroups specified by memberOf.

levelOfNesting may have, for example, a value of 0 to 2, and a SuperGroup which does not belong to any other SuperGroup has a levelOfNesting value of 0.

A maximum number of times of nesting is restricted to, for example, 3.

In FIG. 53, an example of hierarchically configuring a COD service using the extended SuperGroup is shown.

An uppermost-level SuperGroup within the COD service indicates an uppermost-level SuperGroup which does not belong to any others SuperGroup and may be checked by the levelOfNesting set to 0. The following query parameter for retrieving such uppermost-level SuperGroups is additionally necessary.

<key>: "levelOfNesting"
<value>: Integer of 0 to 2, which indicates in which step the SuperGroup is nested.
Meaning: The SuperGroup in which levelOfNesting is equal to <value> is returned.

Using the additional parameter, the uppermost-level SuperGroup information may be queried through the following query parameter.

targetServiceID=<Target COD Service ID>: ID of the COD service to perform hierarchical navigation
fragmentType=0x87: restricted to (supergroup)
levelOfDetail=list: Only an uppermost-level SuperGroup is requested.
SuperGroupType="hierarchyOfService": Only the SuperGroup configuring the service in the hierarchical structure is requested.

Further, as another embodiment, if a SuperGroup which does not belong to any other SuperGroup is defined as a top element, the following query parameter may be defined in order to acquire uppermost-level SuperGroups.

<key>: "top"
<value>: "true"
Meaning: ITF requests all the Top elements of a hierarchy of EPG Metadata for a Service. Top element means a SuperGroup element does not belong to any other SuperGroup.

The query using the above parameter may be configured using the following query parameter.

targetServiceID=<Target COD Service ID>: ID of the COD service to perform hierarchical navigation
top=true
For navigation to a low level after acquiring the uppermost-level SuperGroup, the following query parameter is added.
<key>: "memberOf"
<value>: GroupID
Meaning: A group or a SuperGroup having a value equal to the GroupId of <value> is requested by a memberOf low-level element. Information about SuperGroup/Group/Program belonging to the Group or SuperGroup specified by <value> is requested.

The parameter of the query progressing to a low step of the hierarchical structure using the above parameter is as follows.

targetServiceID=<Target COD Service ID>: ID of the COD service to perform hierarchical navigation
memberOf=<GroupID of currently selected Group or SuperGroup>

When browsing is performed from a high-level step to a low-level step, the EPG fragments are received through the above query and are displayed to the user. At this time, the receiver may cache and store the fragments received from the uppermost-level step to the current step. When returning to a previous step, the result stored in the receiver may be directly displayed to the user without transmitting a query to the server.

If the fragments cannot be stored due to storage space limitations, query sentences are stored in order of steps from a high-level step to a low-level step, and a query is sent again so as to receive the result when returning to a previous step.

In summary, one embodiment of the present invention is as follows.

As shown in FIGS. 4 and 5, the network device according to one embodiment of the present invention performs a service discovery procedure utilizing multiple service discovery metadata components supplied by a service provider. The performing step includes receiving a master SI table which locates in a master SI table location in provisioning information, receiving a virtual channel map table which locates in virtual channel map locations in the received master SI table, receiving a virtual channel description table which locates in virtual channel description table locations in the received virtual channel map table, and receiving a source table which locates in source table locations in the received virtual channel description table.

The performing step may be performed by the service delivery manager shown in FIG. 38.

Further, for more rapid navigation between layers, EPG metadata corresponding to super group information shown in FIG. 54 is received. An operation for receiving EPG metadata corresponding to the super group information may be performed by the network interface shown in FIG. 38. In addition, the super group information element includes both a member element and a level attribute, the member element corresponds to level of nesting shown in FIG. 54, and the level attribute corresponds to the Memberof shown in FIG. 54.

The level attribute gives a level of super group represented by the super group information element.

Further, the member element is used to reference the other super group information element at a higher level.

The network device processes EPG metadata. The processing of the EPG metadata may be performed by the metadata manager shown in FIG. 38 or another controller.

The member element indicates super groups to which the super group represented by the super group information element belongs.

The provisioning information has EPG provider information element and EPG data locator element, both of the elements having a first sub element on a target service ID and a second sub element on a type of target services. None of the first sub element that appears in the EPG provider information element applies to EPG data sources if the first sub element appears in the EPG data locator element.

Accordingly, it is possible to prevent data from being repeatedly generated in levels.

The provisioning information is obtained by the network device during an SP (service provider) attachment.

The network device corresponds to at least one of an ITF (IPTV Terminal Function) device, a mobile device and a digital television.

Delivery of the EPG metadata is performed using a service guide delivery unit (SGDU) containing a collection of fragments that meet a grouping criteria, and grouping of the fragments in the SGDU conforms to the grouping criteria declared for the SGDU in SGDDs (Service Guide Delivery Descriptors) announcing the SGDU.

The grouping criteria is based on at least one of a start time, an end time, a service ID, and genre properties of schedule events.

The fragments correspond to at least one of a program information fragment, a schedule fragment, and a review fragment.

Figure 56:
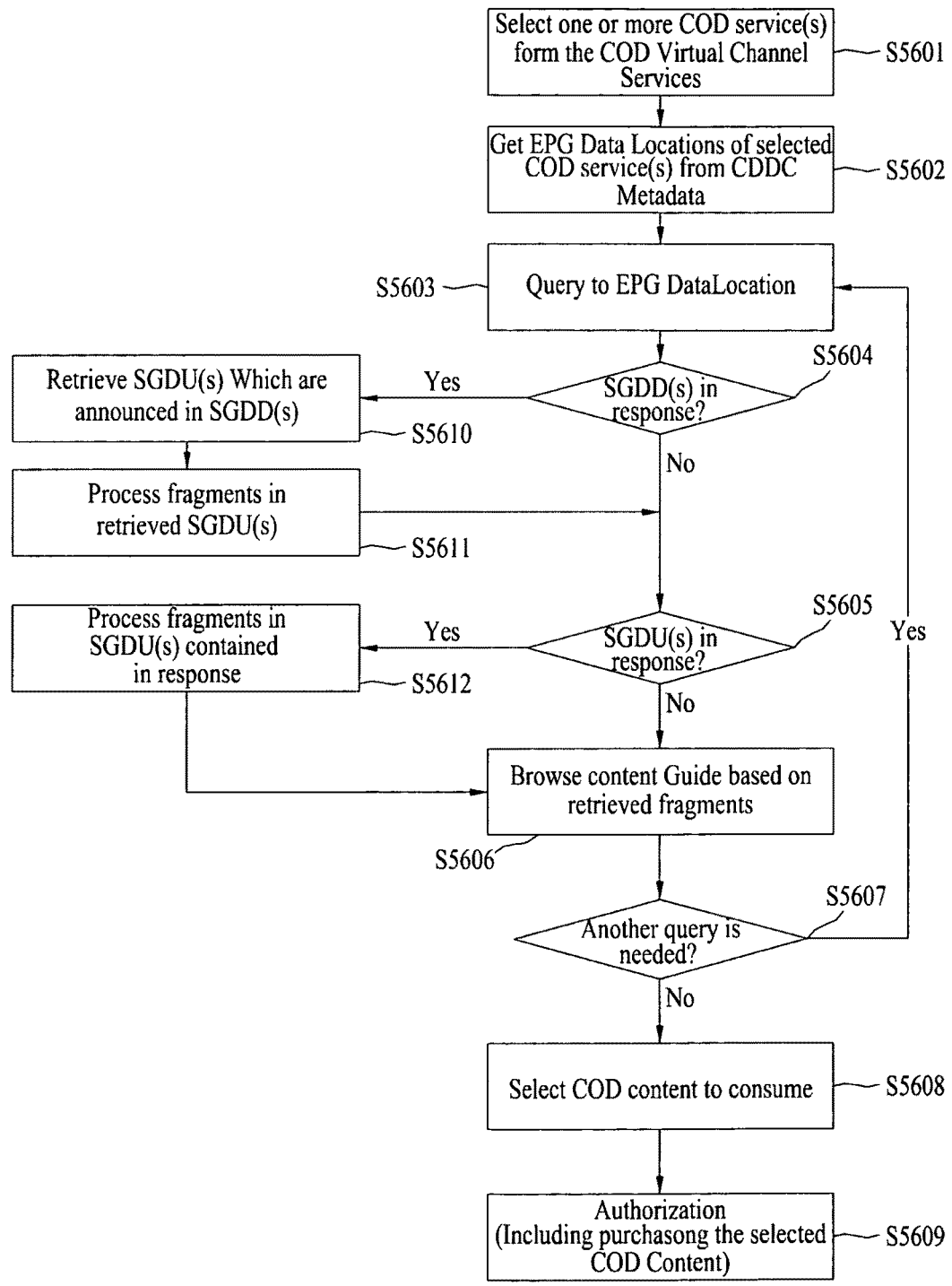
FIG. 56 is a flowchart illustrating a method of processing content metadata using a query method, according to an embodiment of the present invention.

FIG. 56 is a flowchart illustrating a method of processing content metadata using a query method, according to an embodiment of the present invention.

FIG. 56 shows a detailed operation flow of a portion for receiving and processing content metadata.

Metadata for COD content is received by requesting the metadata to the EPG dataLocation server using the above-described query method. The above flowchart describes the processing method of this case.

In the response of the server to the query request, the unit for delivering the fragments of the EPG metadata includes a Service Guide Delivery Unit (SGDU) or a Service Guide Delivery Descriptor (SGDD) capable of announcing SGDUs. The above flowchart includes the method of processing responses having various configurations.

If the SGDD is included in the response, SGDDs announced through the SGDD are received and processed, and the SGDUs included in the response are processed. All the fragments of the EPG metadata corresponding to the result of the query are received and are displayed to the user so as to enable the user to perform browsing.

If an additional query is necessary, the above process is repeatedly performed and rights are acquired through an authorization process when content to be consumed is selected.

Steps will be described in detail with respect to FIG. 56.

A network device selects one or more COD service(s) from the COD Virtual Channel Services (S5601). The network device gets EPG data locations of selected COD service(s) from CDDC Metadata (S5602). The network device performs query to EPG Data Location (S5603).

The network device determines whether there is SGDD(s) in response (S5604). If not, the network device determines whether there is SGDU(s) in response (S5605). If yes, the network device browses content guide based on retrieved fragments (S5606).

The network device determines whether another query is needed (S5607). If not, the network device selects COD content to consume (S5608). The network device performs authorization (including purchasing the selected COD content) (S5609).

If yes (S5604), the network device retrieves SGDU(s) which are announced in SGDD(s) (S5610). The network device processes fragments in retrieved SGDU(s) (S5611).

If yes (S5605), the network device processes fragments in SGDU(s) contained in response (S5612).

Figure 57:
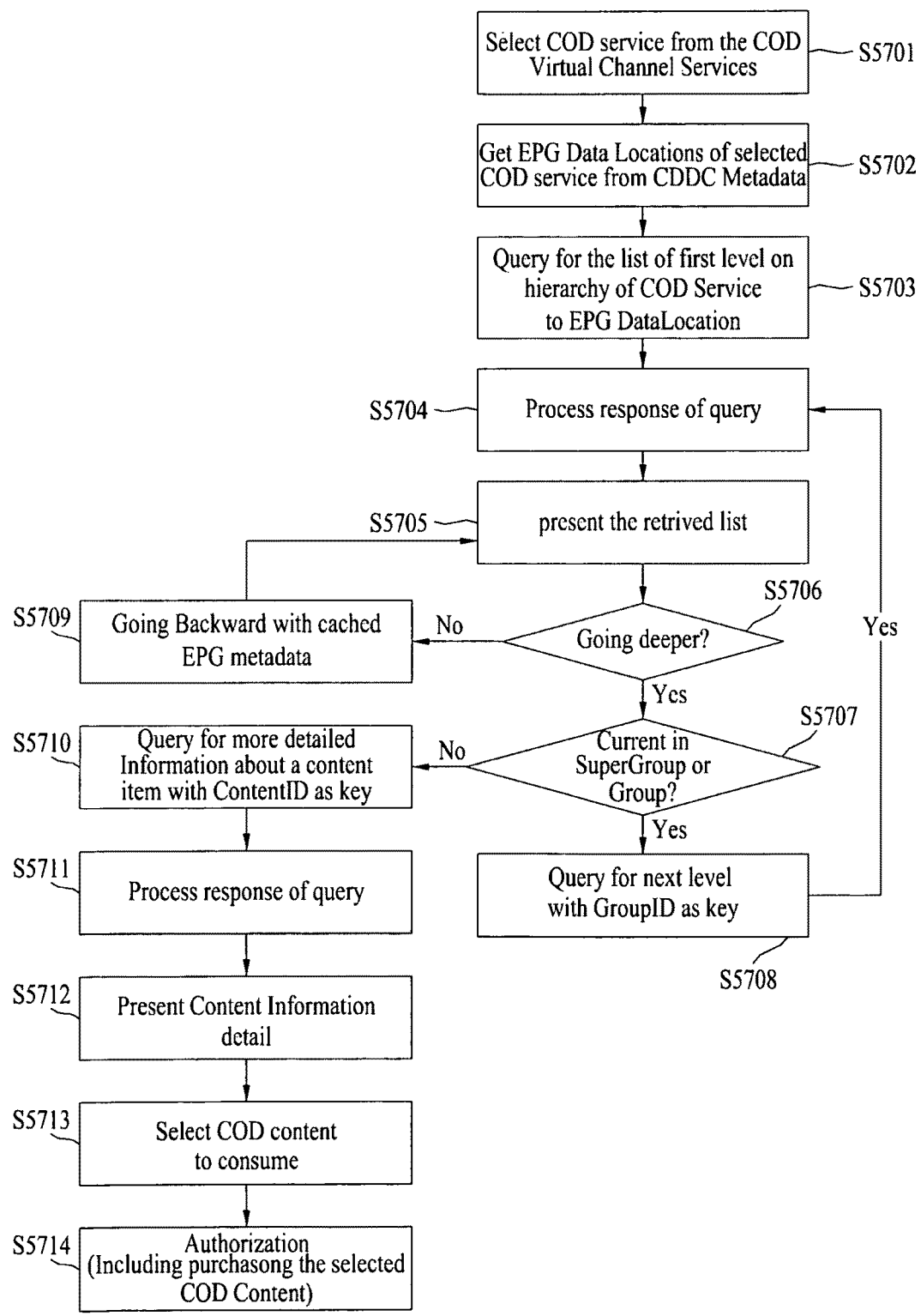
FIG. 57 is a flowchart illustrating a method of executing COD service navigation using a query method, according to an embodiment of the present invention.

FIG. 57 is a flowchart illustrating a method of executing COD service navigation using a query method, according to an embodiment of the present invention.

FIG. 57 shows a detailed operation flow of a portion for receiving and processing content metadata.

The above flowchart describes a process of configuring content in the COD service in a hierarchical structure as described above and navigating the content based on a query mechanism.

A list of SuperGroups belonging to a first level in the COD service is queried based on the above-described query mechanism and is displayed to the user. The user performs navigation along the hierarchical tree structure. If a current location is a SuperGroup or a Group, a GroupID is used as a key so as to acquire a list (or more detailed information) of a low-level SuperGroup/Group/Program belonging to the SuperGroup/Group through a query. The detailed information about a lowermost-level program of the hierarchical structure can be acquired by performing a query using a ContentID as a key.

The network device selects a COD service from the COD Virtual Channel Services (S5701). The network device gets EPG Data Locations of selected COD service from CDDC Metadata (S5702). The network device performs query for the list of first level on hierarchy of COD service to EPG Data Location (S5703). The network device processes a response to the query (S5704). The network device presents the retrieved list (S5705).

The network device determines whether going deeper (S5706). If yes, the network device determines whether a current status is in a super group or group (S5707). If yes, the network device performs query for next level with Group ID as key (S5708).

If not (S5706), the network device goes backward with cached EPG Metadata (S5709). If not (S5707), the network device performs query for more detailed information about a content item with content ID as key (S5710). The network device processes a response to the query (S5711). The network device presents content information detail (S5712). The network device selects COD content to consume (S5713). The network device performs authorization (including purchasing the selected COD content) (S5714).

Meanwhile, a method according to the present invention is recordable in a computer readable medium in a manner of being implemented into a program command type executable through various computer means. The computer readable medium can include a program command, a data file, a data structure or combinations thereof. The program command recorded in the medium is specially designed and configured for the present invention or can be known in public to those skilled in the field of software. For example, the computer readable recording medium includes a magnetic medium such as a hard disk, a floppy disk and a magnetic tape, an optical medium such as a CD-ROM and a DVD, a magneto-optical medium such as a floptical disk, or such a hardware device specially configured to store and execute a program command as a ROM, a RAM, a flash memory and the like. For example, the program command includes a machine code created by compiler or a high-level language code executable by a computer using an interpreter and the like. The hardware device can be configured to operate as at least one software module to perform an operation of the present invention, and vice versa.

As mentioned in the foregoing description, the relevant matters are described in the best mode of the present invention.

Regarding industrial applicability, the present invention is applicable to a digital broadcasting system entirely or in part.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of processing EPG (Electronic Program Guide) metadata in a network device, the method comprising:
performing a service discovery procedure utilizing multiple service discovery metadata components supplied by a service provider, wherein the step of performing comprises:
receiving a master SI table which locates in a master SI table location in provisioning information, receiving a virtual channel map table which locates in virtual channel map locations in the received master SI table,
receiving a virtual channel description table which locates in virtual channel description table locations in the received virtual channel map table, and
receiving a source table which locates in source table locations in the received virtual channel description table;
receiving EPG metadata corresponding to a super group information element comprising both of a member element giving a group ID of another super group information element that has a higher level than a level of the super group information element and a level attribute giving a level of super group represented by the super group information element, wherein the member element is used to reference the other super group information element at a higher level; and
processing the EPG metadata.

2. The method of claim 1, wherein the member element indicates super groups to which the super group represented by the super group information element belongs.

3. The method of claim 1, wherein the provisioning information has EPG provider information element and EPG data locator element, both of the elements having a first sub element on a target service ID and a second sub element on a type of target services.

4. The method of claim 3, wherein none of the first sub element that appears in the EPG provider information element applies to EPG data sources if the first sub element appears in the EPG data locator element.

5. The method of claim 1, wherein the provisioning information is obtained by the network device during SP (service provider) attachment.

6. The method of claim 1, wherein the network device corresponds to at least one of an ITF (IPTV Terminal Function) device, a mobile device and a digital television.

7. The method of claim 1, wherein a delivery of the EPG metadata performs using a service guide delivery unit (SGDU) containing a collection of fragments that meet a grouping criteria, and a grouping of the fragments in the SGDU conforms to the grouping criteria declared for the SGDU in SGDDs (Service Guide Delivery Descriptors) announcing the SGDU.

8. The method of claim 7, wherein the grouping criteria is based on at least one of a start time, an end time, a service ID, and genre properties of schedule events.

9. The method of claim 7, wherein the fragments correspond to at least one of a program information fragment, a schedule fragment, and a review fragment.

10. A network device for processing EPG (Electronic Program Guide) metadata, the network device comprising:
a service discovery manager configured to perform a service discovery procedure utilizing multiple service discovery metadata components supplied by a service provider, wherein the service discovery manager is further configured to:
receive a master SI table which locates in a master SI table location in provisioning information,
receive a virtual channel map table which locates in virtual channel map locations in the received master SI table,
receive a virtual channel description table which locates in virtual channel description table locations in the received virtual channel map table, and
receive a source table which locates in source table locations in the received virtual channel description table;
a receiving module configured to receive EPG metadata corresponding to a super group information element comprising both of a member element giving a group ID of another super group information element that has a higher level than a level of the super group information element and a level attribute giving a level of a super group represented by the super group information element, wherein the member element is used to reference the other super group information element at a higher level; and
a controller configured to process the EPG metadata.

11. The network device of claim 10, wherein the member element indicates super groups to which the super group represented by the super group information element belongs.

12. The network device of claim 10, wherein the provisioning information has EPG provider information element and EPG data locator element, both of the elements having a first sub element on a target service ID and a second sub element on a type of target services.

13. The network device of claim 12, wherein none of the first sub element that appears in the EPG provider information element applies to EPG data sources if the first sub element appears in the EPG data locator element.

14. The network device of claim 10, wherein the provisioning information is obtained by the network device during SP (service provider) attachment.

15. The network device of claim 10, wherein the network device corresponds to at least one of an ITF (IPTV Terminal Function) device, a mobile device and a digital television.

16. The network device of claim 10, wherein delivery of the EPG metadata is performed using a service guide delivery unit (SGDU) containing a collection of fragments that meet a grouping criteria, and a grouping of the fragments in the SGDU conforms to the grouping criteria declared for the SGDU in SGDDs (Service Guide Delivery Descriptors) announcing the SGDU.

17. The network device of claim 16, wherein the grouping criteria is based on at least one of a start time, an end time, a service ID, and genre properties of schedule events.

18. The network device of claim 16, wherein the fragments correspond to at least one of a program information fragment, a schedule fragment, and a review fragment.

* * * * *